United States Patent
Kim et al.

(10) Patent No.: US 10,468,021 B2
(45) Date of Patent: Nov. 5, 2019

(54) MOBILE TERMINAL AND METHOD FOR CONTROLLING THE SAME

(71) Applicant: LG ELECTRONICS INC., Seoul (KR)

(72) Inventors: Jongchul Kim, Seoul (KR); Sunghee Jo, Seoul (KR); Kibong Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 875 days.

(21) Appl. No.: 14/852,132

(22) Filed: Sep. 11, 2015

(65) Prior Publication Data

US 2016/0098157 A1  Apr. 7, 2016

(30) Foreign Application Priority Data

Oct. 1, 2014 (KR) ........................ 10-2014-0132422

(51) Int. Cl.
*G06F 3/0486* (2013.01)
*G10L 15/22* (2006.01)
*G06F 3/16* (2006.01)

(52) U.S. Cl.
CPC .............. *G10L 15/22* (2013.01); *G06F 3/167* (2013.01); *G06F 3/0486* (2013.01)

(58) Field of Classification Search
None
See application file for complete search history.

(56) References Cited

U.S. PATENT DOCUMENTS

| 5,764,873 | A | * | 6/1998 | Magid | G06F 3/0486 715/769 |
| 6,366,906 | B1 | * | 4/2002 | Hoffman | G06F 17/30637 |
| 6,785,670 | B1 | * | 8/2004 | Chiang | G06F 17/30637 707/706 |
| 6,928,622 | B2 | * | 8/2005 | Bosma | G06F 3/0481 715/764 |
| 7,705,830 | B2 | * | 4/2010 | Westerman | G06F 3/04883 345/173 |
| 8,184,102 | B2 | * | 5/2012 | Park | G06F 3/04883 345/173 |
| 8,380,512 | B2 | * | 2/2013 | Bonforte | G06F 17/30755 704/270 |

(Continued)

FOREIGN PATENT DOCUMENTS

| KR | 1020140062568 | * | 5/2014 |
| KR | 20150135042 A | * | 12/2015 |

OTHER PUBLICATIONS

Review: CamFind for iPhone lets you search for anything with your camera, Apr. 19, 2013, 6 pages.*
Quick Search Widget, Jul. 31, 2014, 3 pages.*

*Primary Examiner* — Yongjia Pan
(74) *Attorney, Agent, or Firm* — Lee, Hong, Degerman, Kang & Waimey

(57) ABSTRACT

The present invention discloses a mobile terminal of which a process of selecting a search engine for web search and a process of inputting a keyword are simplified. The mobile terminal according to this application may include a microphone, a wireless communication unit, a display unit and a controller configured to select a search engine usable for the web search set a keyword based on a voice inputted via the microphone perform a web search using the text.

20 Claims, 35 Drawing Sheets

(56) References Cited

U.S. PATENT DOCUMENTS

| | | | | |
|---|---|---|---|---|
| 8,477,112 | B2* | 7/2013 | Lee | G06F 3/0482 345/173 |
| 8,830,181 | B1* | 9/2014 | Clark | G06F 3/04883 345/173 |
| 9,262,525 | B2* | 2/2016 | Shafer | G06F 17/30477 |
| 9,529,522 | B1* | 12/2016 | Barros | G06F 3/0488 |
| 9,684,521 | B2* | 6/2017 | Shaffer | G06F 9/451 |
| 9,690,470 | B2* | 6/2017 | Townsend | G06F 3/0488 |
| 9,990,433 | B2* | 6/2018 | Kang | G06F 17/30867 |
| 2004/0061720 | A1* | 4/2004 | Weber | G06F 17/30899 715/760 |
| 2006/0129945 | A1* | 6/2006 | Dettinger | G06F 9/451 715/769 |
| 2006/0190441 | A1* | 8/2006 | Gross | G06F 17/30864 |
| 2008/0208819 | A1* | 8/2008 | Wang | G06F 16/338 |
| 2009/0172593 | A1* | 7/2009 | Geurts | G06F 3/0488 715/810 |
| 2010/0017734 | A1* | 1/2010 | Cummins | G06F 3/0486 715/769 |
| 2010/0020025 | A1* | 1/2010 | Lemort | G06F 3/04883 345/173 |
| 2012/0096354 | A1* | 4/2012 | Park | G06F 17/30696 715/719 |
| 2012/0174041 | A1* | 7/2012 | Queru | B60K 37/06 715/863 |
| 2013/0124495 | A1* | 5/2013 | Sejnoha | G06F 17/30864 707/707 |
| 2013/0227490 | A1* | 8/2013 | Thorsander | G06F 3/0482 715/841 |
| 2014/0195959 | A1* | 7/2014 | Yoo | G06F 3/04886 715/773 |
| 2014/0214785 | A1* | 7/2014 | Edberg | G06F 17/30867 707/706 |
| 2014/0282161 | A1* | 9/2014 | Cash | G06F 3/017 715/769 |
| 2015/0193509 | A1* | 7/2015 | Li | G06F 16/248 707/722 |
| 2015/0339391 | A1* | 11/2015 | Kang | G06F 17/30867 707/722 |
| 2016/0006856 | A1* | 1/2016 | Bruno | H04M 1/72547 715/809 |

* cited by examiner

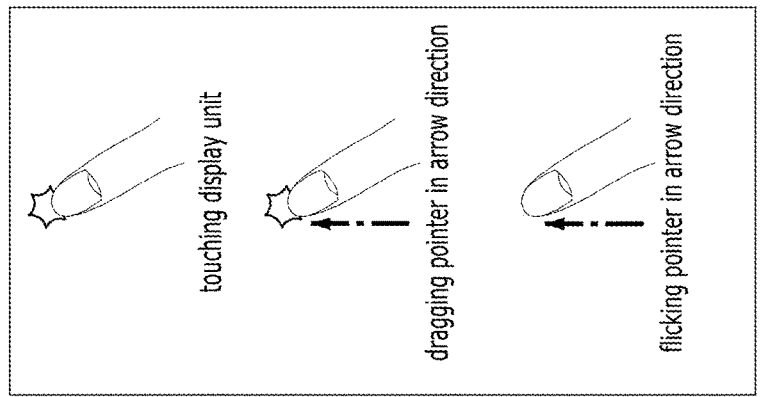
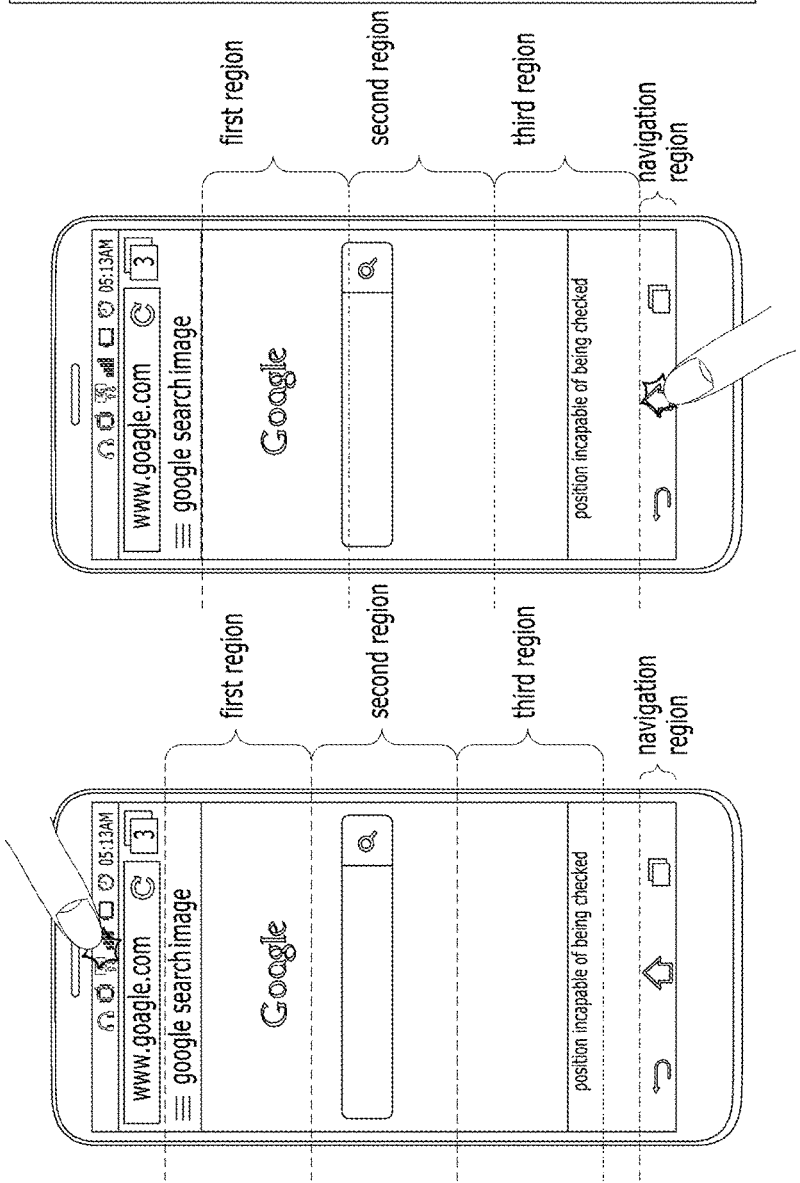

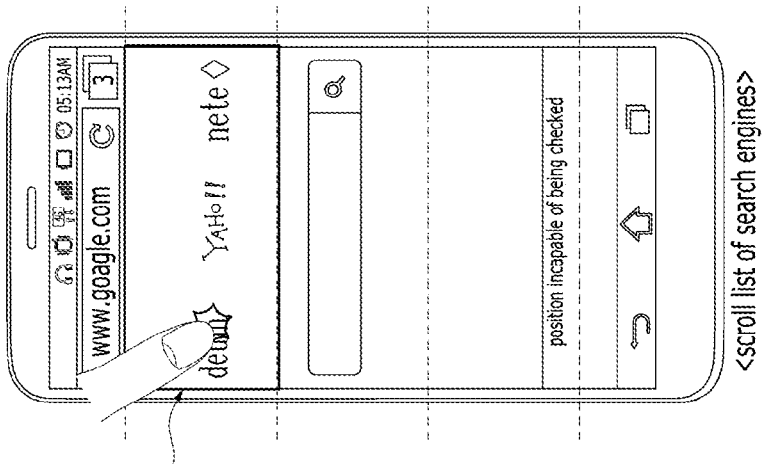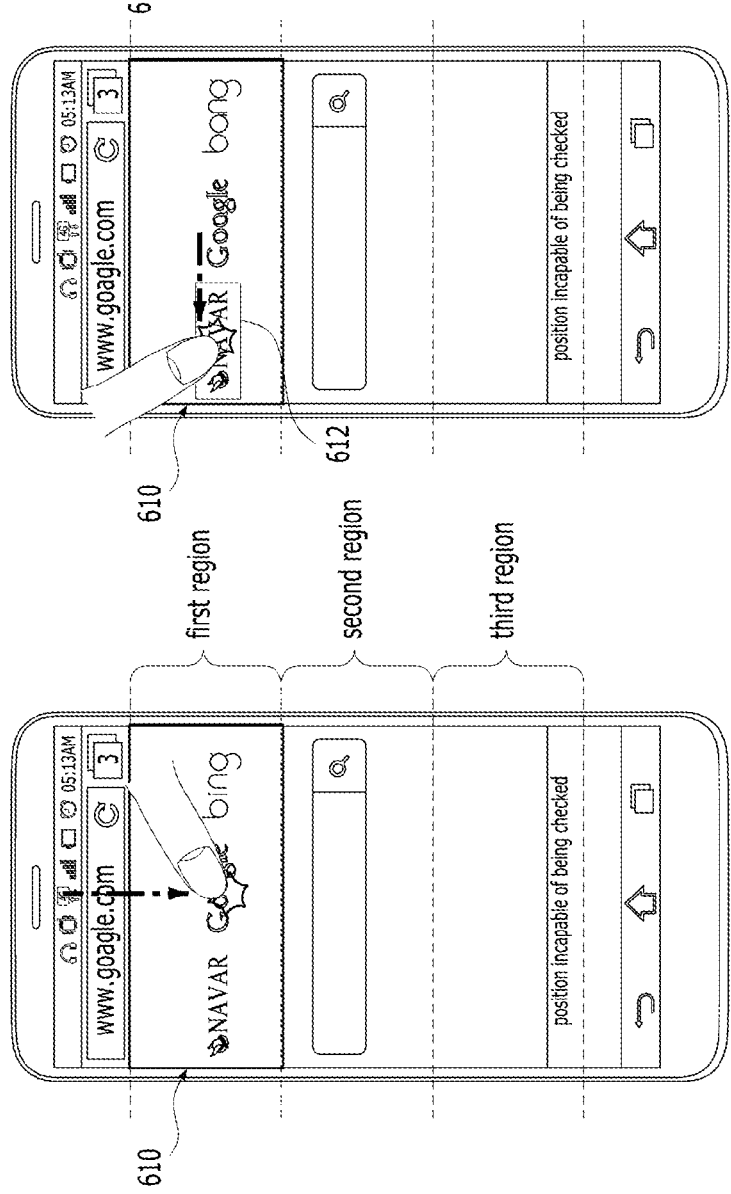

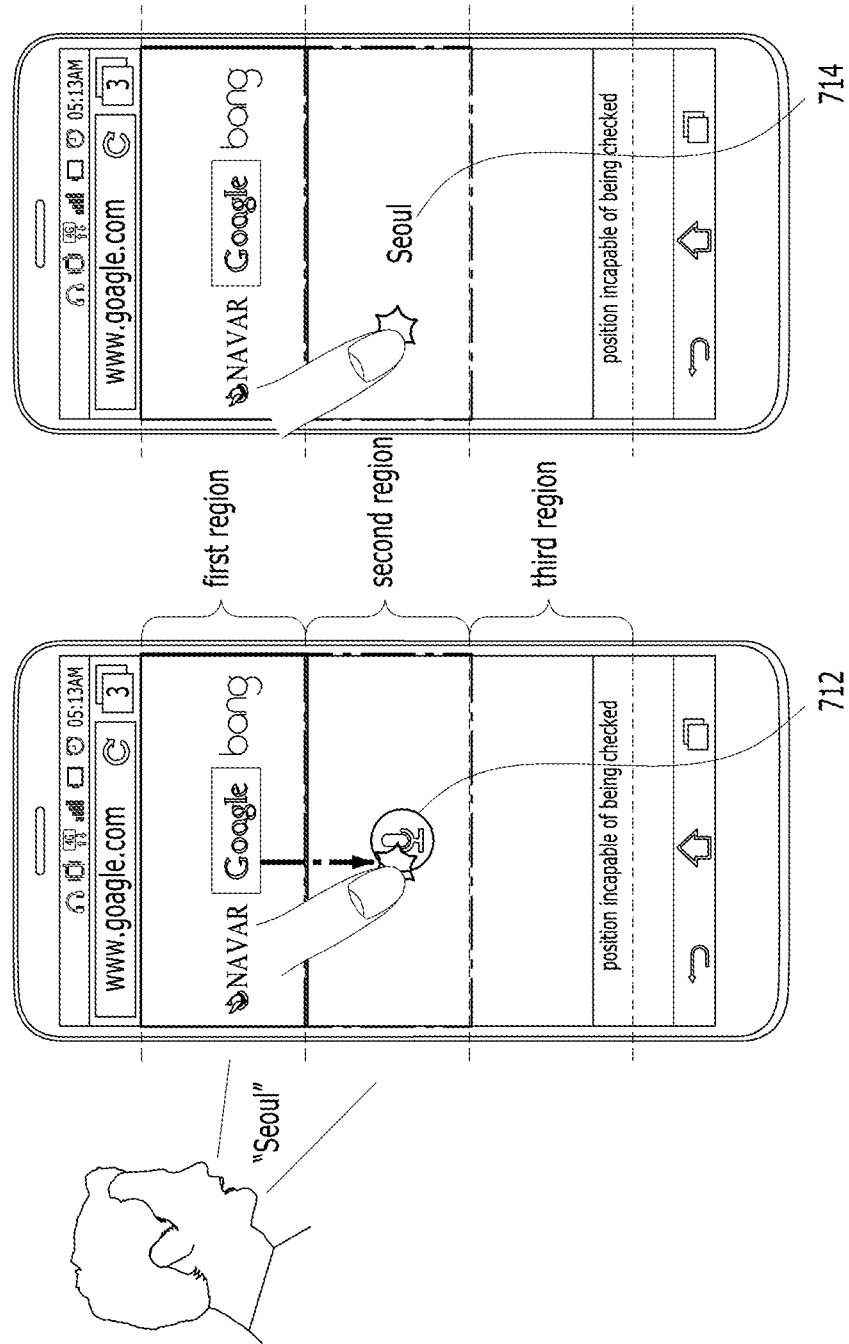

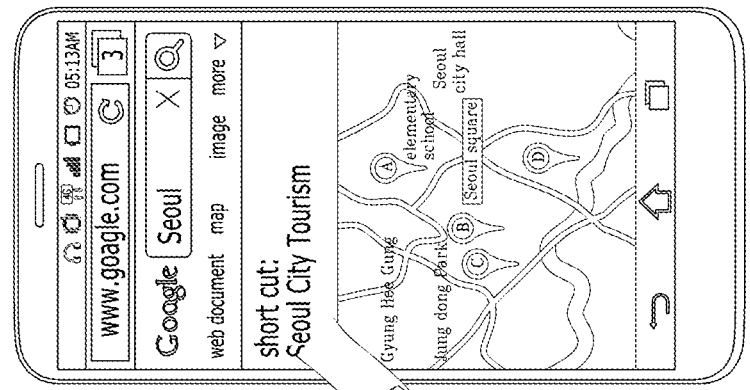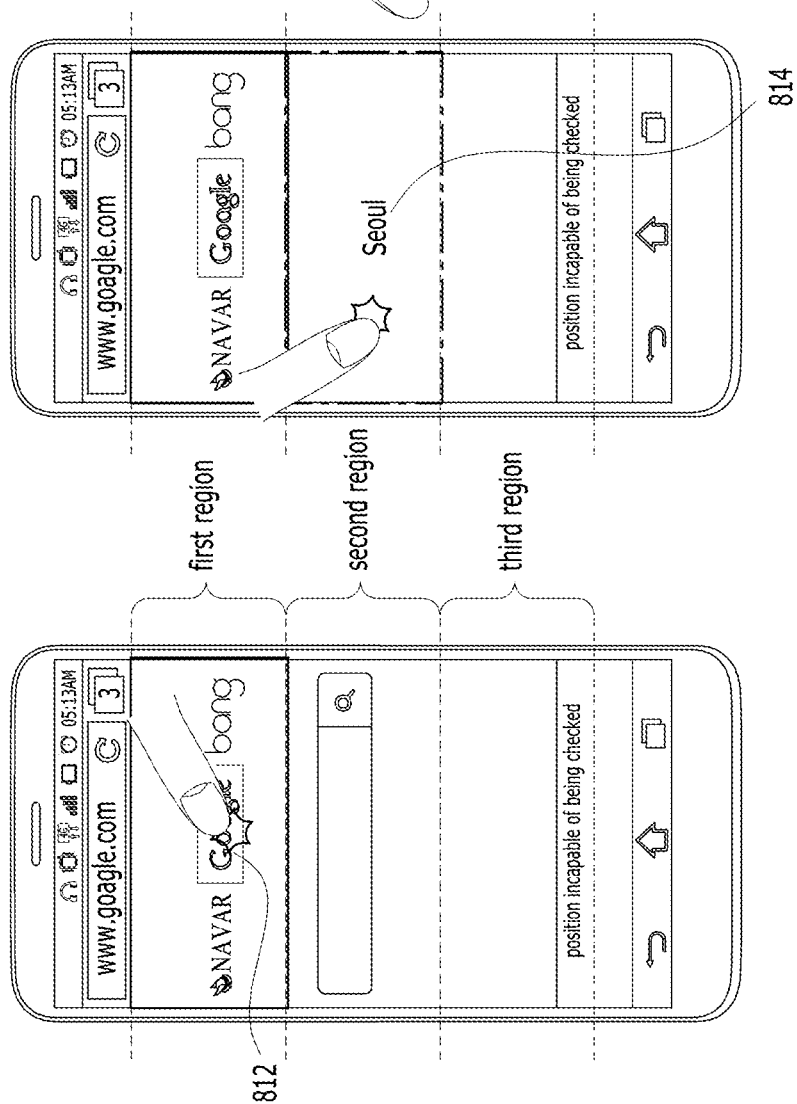

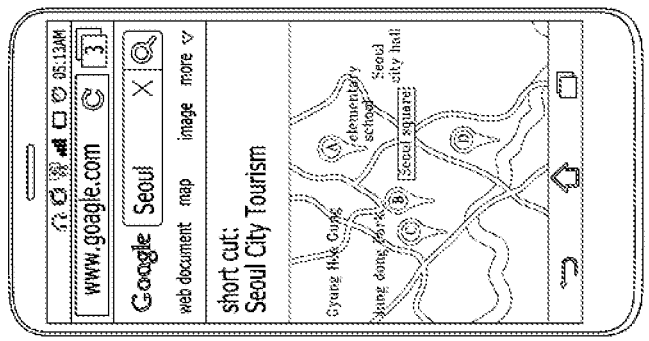
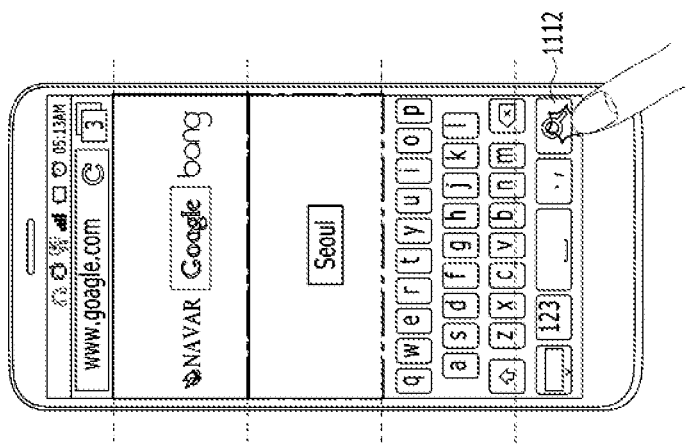
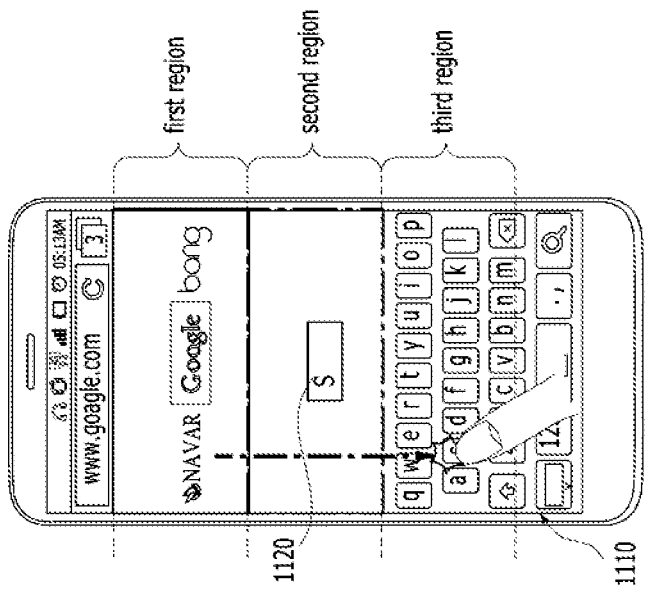

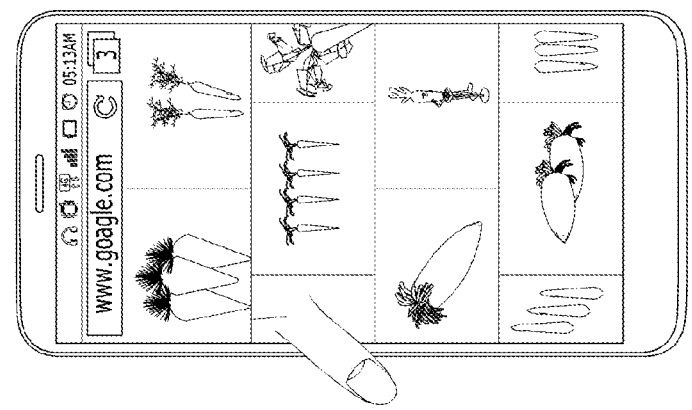
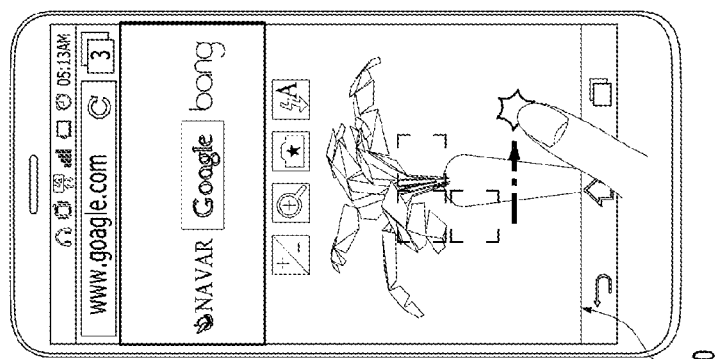
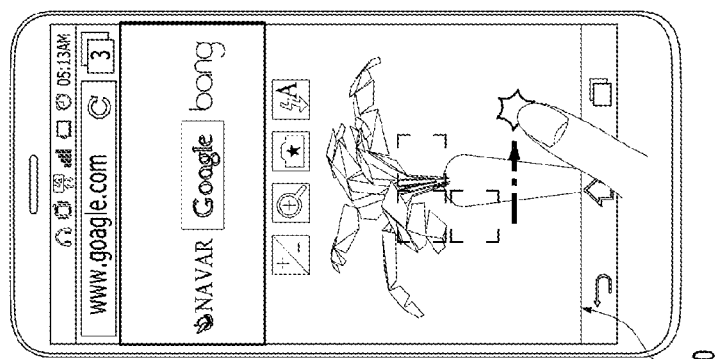
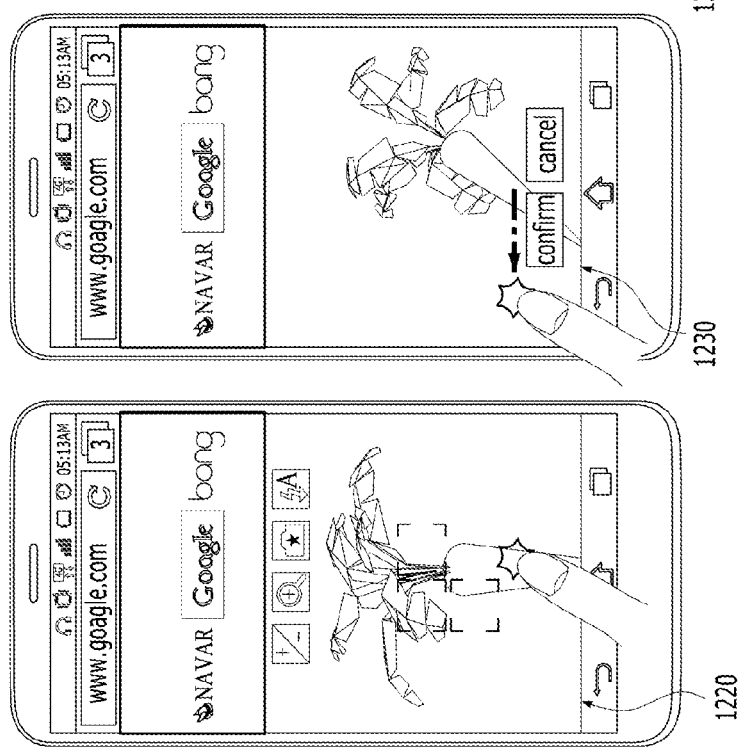

<short cut, output search result of first category>

<output search result of second category>

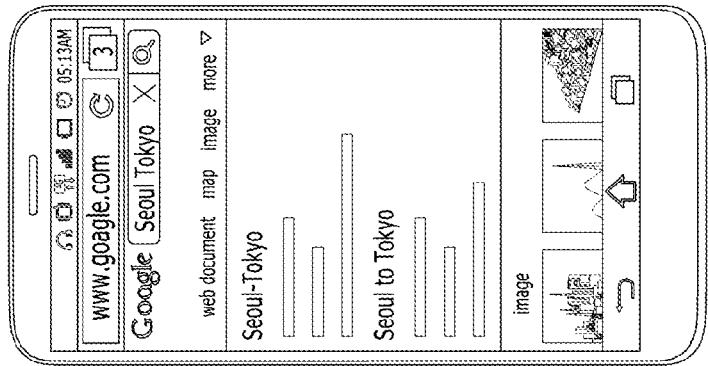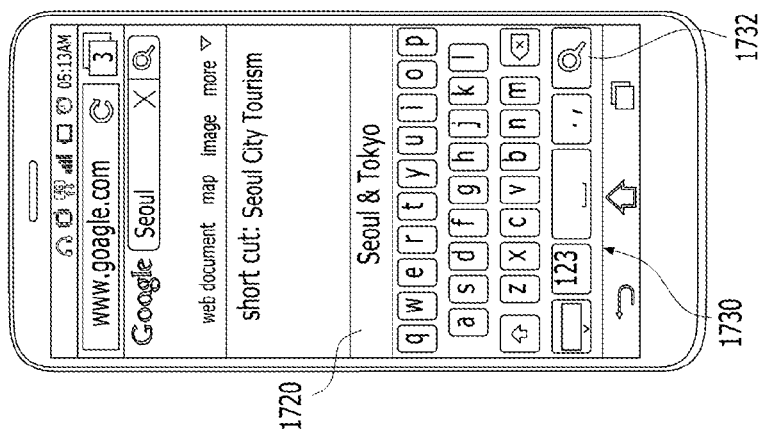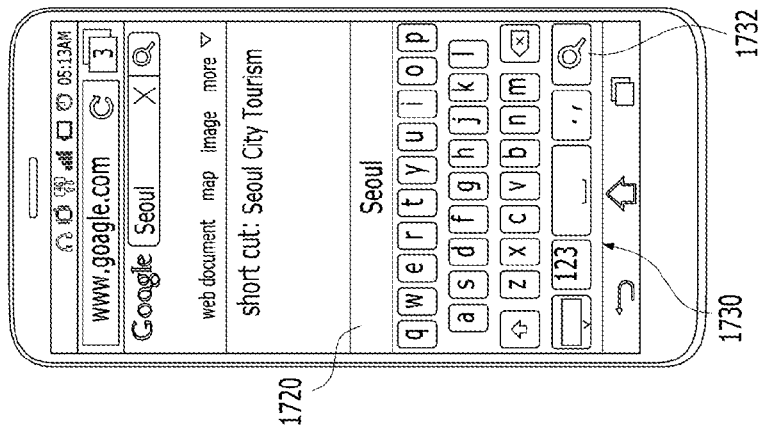

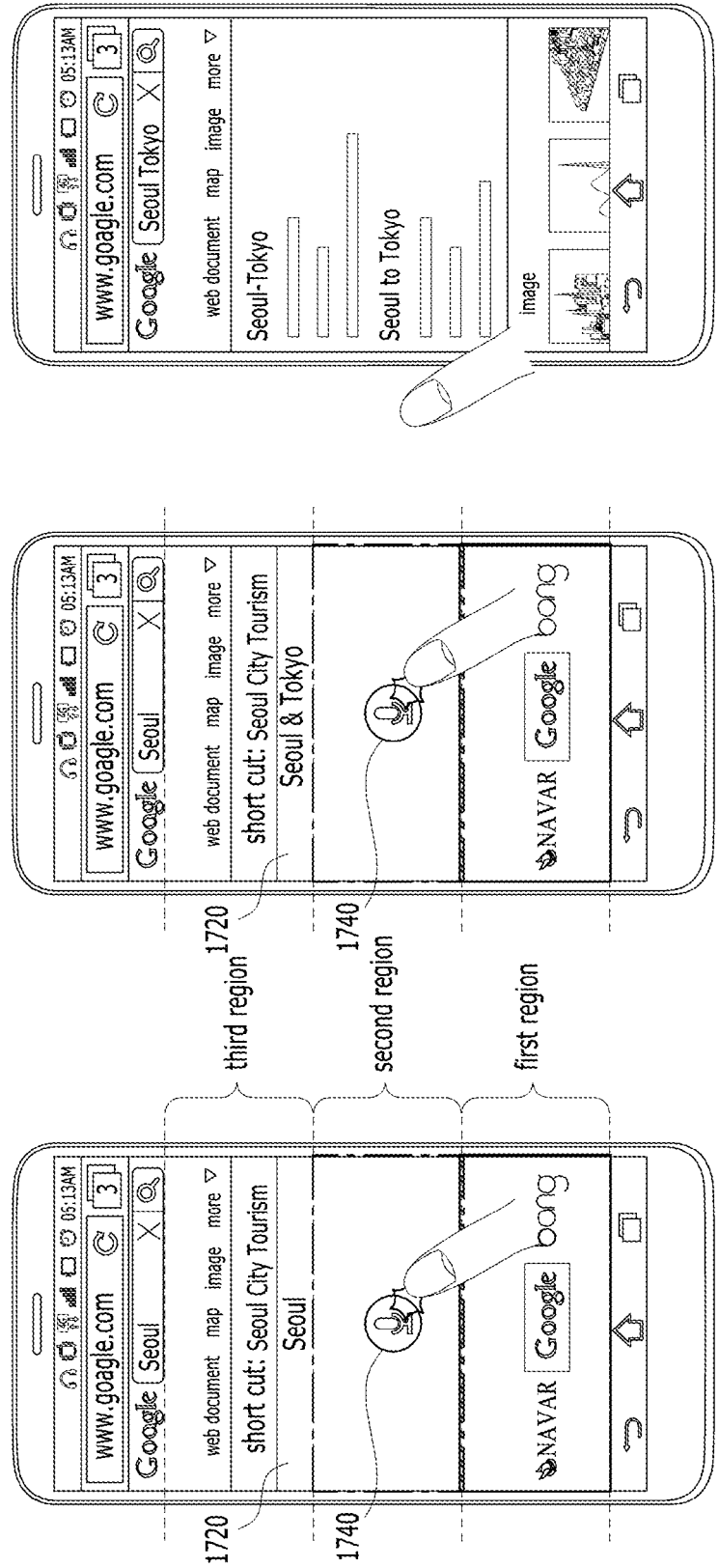

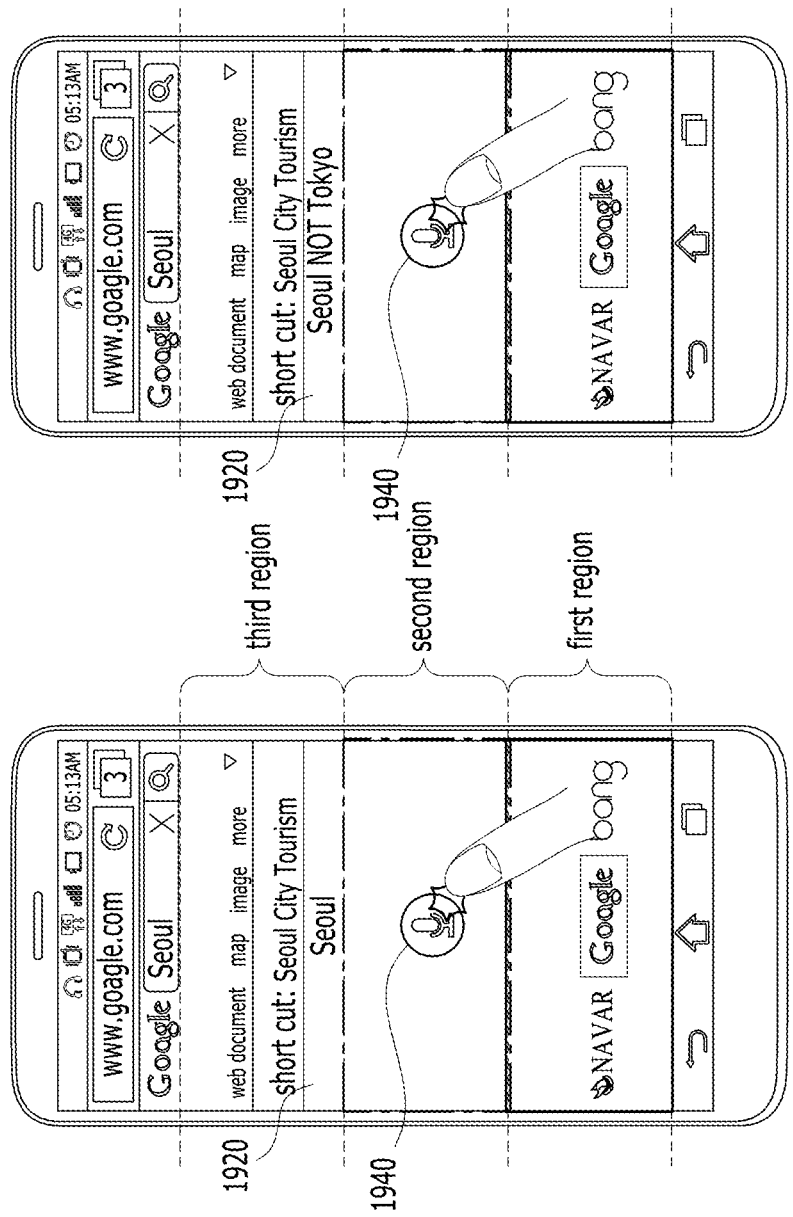

<output second page>

<output part of second page on first page in a manner of being overlaid>

<output first page among search list>

<output keypad>

<display search result of pictures of which Jane is captured>

<output capturing screen>

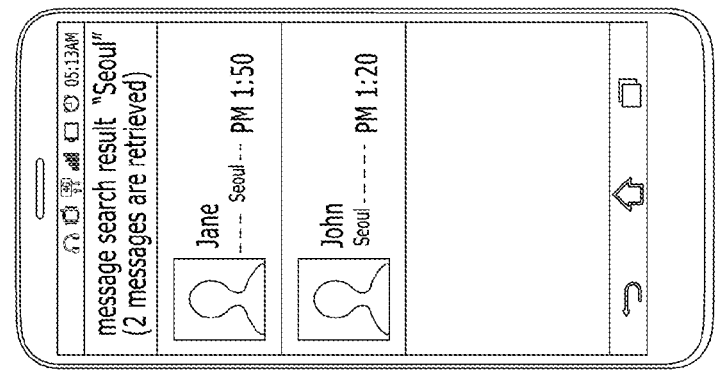
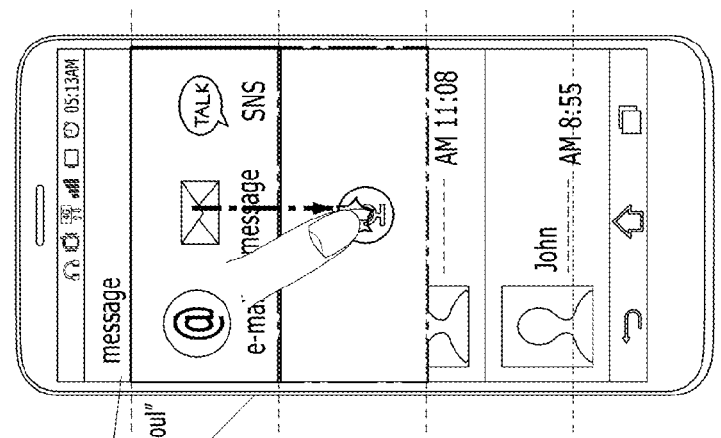
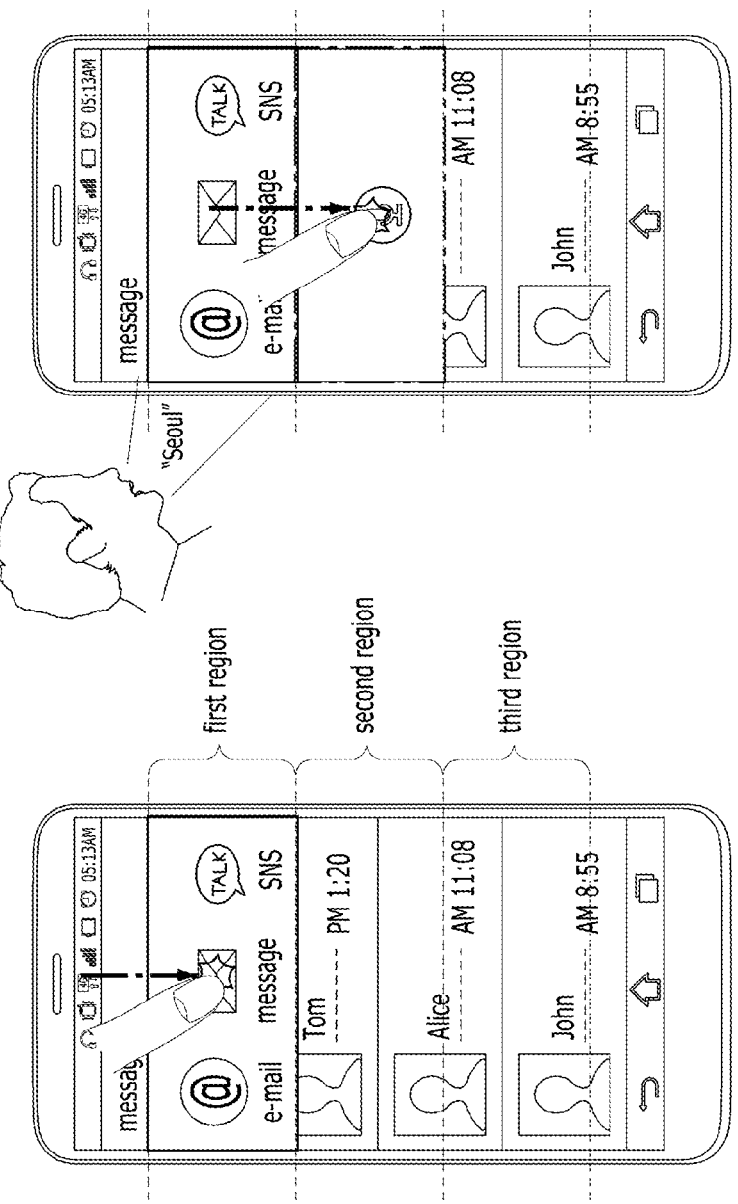

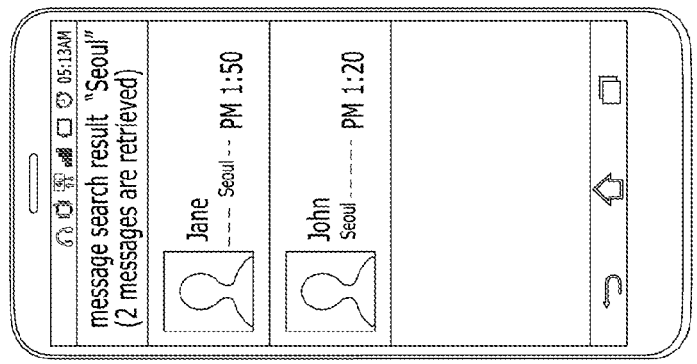
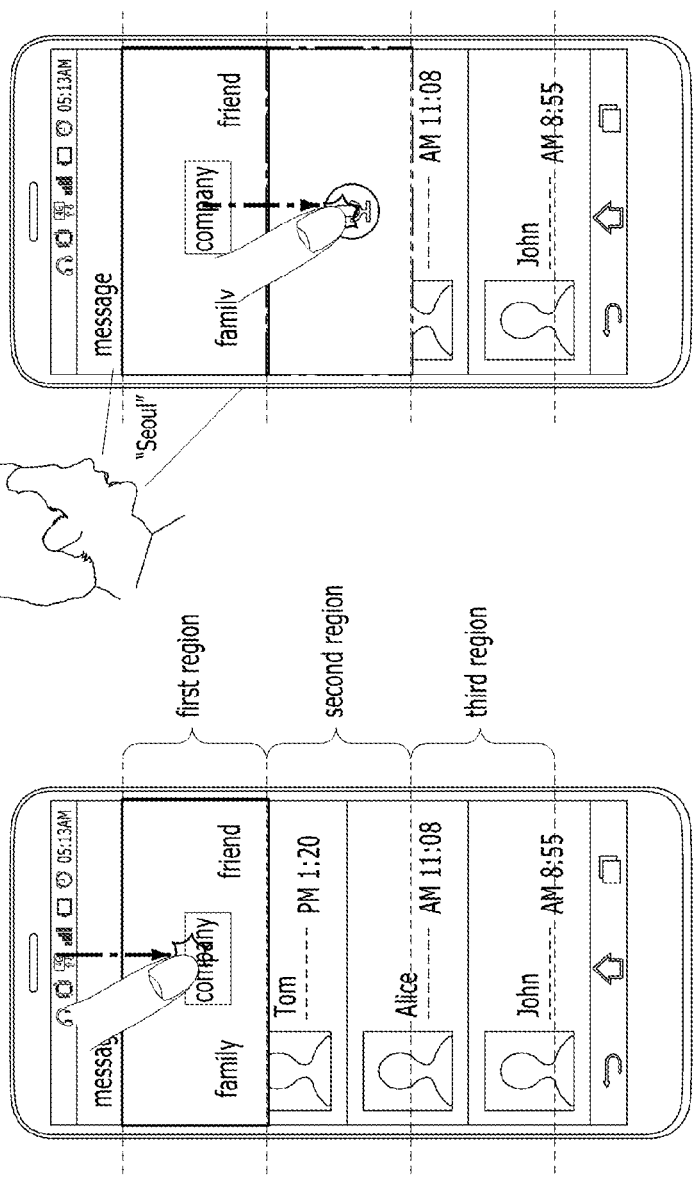

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2014-0132422, filed on Oct. 1, 2014, the contents of which are hereby incorporated by reference herein in its entirety.

BACKGROUND OF THE INVENTION

Field of the Invention

The present invention relates to a mobile terminal of which a process of selecting a search engine for web search and a process of inputting a keyword are simplified and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example.

With the help of dissemination of a mobile terminal, a user accesses a web at any time and any place and may be able to search for preferred information. In this case, the user is able to perform a web search in a manner of selecting a search site from among numerous search sites. In this case, if the user is unable to search for a preferred result via a web search in the search site selected by the user, the user should additionally perform a web search through a different search site.

Yet, in case of performing a web search in a manner of alternately moving one search site to another search site, it may cause inconvenience of a user.

SUMMARY OF THE INVENTION

Accordingly, embodiments of the present invention are directed to a mobile terminal and controlling method thereof that substantially obviate one or more problems due to limitations and disadvantages of the related art.

The present invention is designed for the aforementioned necessity. An object of the present invention is to provide a mobile terminal enhancing user convenience and a method of controlling therefor.

Specifically, one object of the present invention is to provide a mobile terminal capable of easily selecting a search engine to be used for web search.

Another object of the present invention is to provide a mobile terminal capable of easily selecting a keyword to be used for web search.

To achieve these objects and other advantages and in accordance with the purpose of the invention, as embodied and broadly described herein, according to one embodiment, a mobile terminal can include a microphone, a wireless communication unit configured to perform web search, a display unit configured to display a web browser and a controller, if a pointer touching a predetermined first position of the display unit is dragged into a first region on the display unit, configured to control a list of search engines usable for the web search to be displayed via the first region, the controller, if a search engine is selected from the list of search engines and the pointer is dragged to a second region from the first region, configured to control the microphone to be activated, the controller, if a text is generated by converting voice inputted via the microphone while the pointer is touching the second region and the touch of the pointer is released from the second region, configured to control web search using the text to be performed via the selected search engine.

To further achieve these objects and other advantages and in accordance with the purpose of the invention, as embodied and broadly described herein, according to a different embodiment, a method of controlling a mobile terminal can include the steps of, if a pointer touching a predetermined first position of a display unit is dragged into a first region on the display unit, outputting a list of search engines usable for web search via the first region, if a search engine is selected from the list of search engines and the pointer is dragged to a second region from the first region, activating a microphone, converting voice inputted via the microphone into a text, and if the touch of the pointer is released from the display unit, performing web search using the text via the selected search engine.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3A and 3B are diagrams for explaining a virtual region of a display unit;

FIGS. 6A, 6B and 6C are diagrams for an example of displaying a list of search engines;

FIGS. 7A and 7B are diagrams for an example of activating a microphone;

FIGS. 8A, 8B and 8C are diagrams for an example of performing web search;

FIGS. 11A, 11B and 11C are diagrams for an example of outputting a keypad according to movement of a pointer dragged to a third region;

FIGS. 12A, 12B, 12C, 12D, 12E, 12F, 12G and 12H are diagrams for explaining an example of performing web search using an image;

FIGS. 17A, 17B, 17C, 17D, 17E, 17F and 17G are diagrams for an example of outputting a menu for adding a keyword;

FIGS. 19A, 19B, 19C, 19D and 19E are diagrams for an example of outputting a menu for adding a keyword;

FIGS. 24A, 24B, 24C, 24D, 24E and 24F are diagrams for an example of outputting a search result of a message including a search word, which is configured while a pointer touches a display unit.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
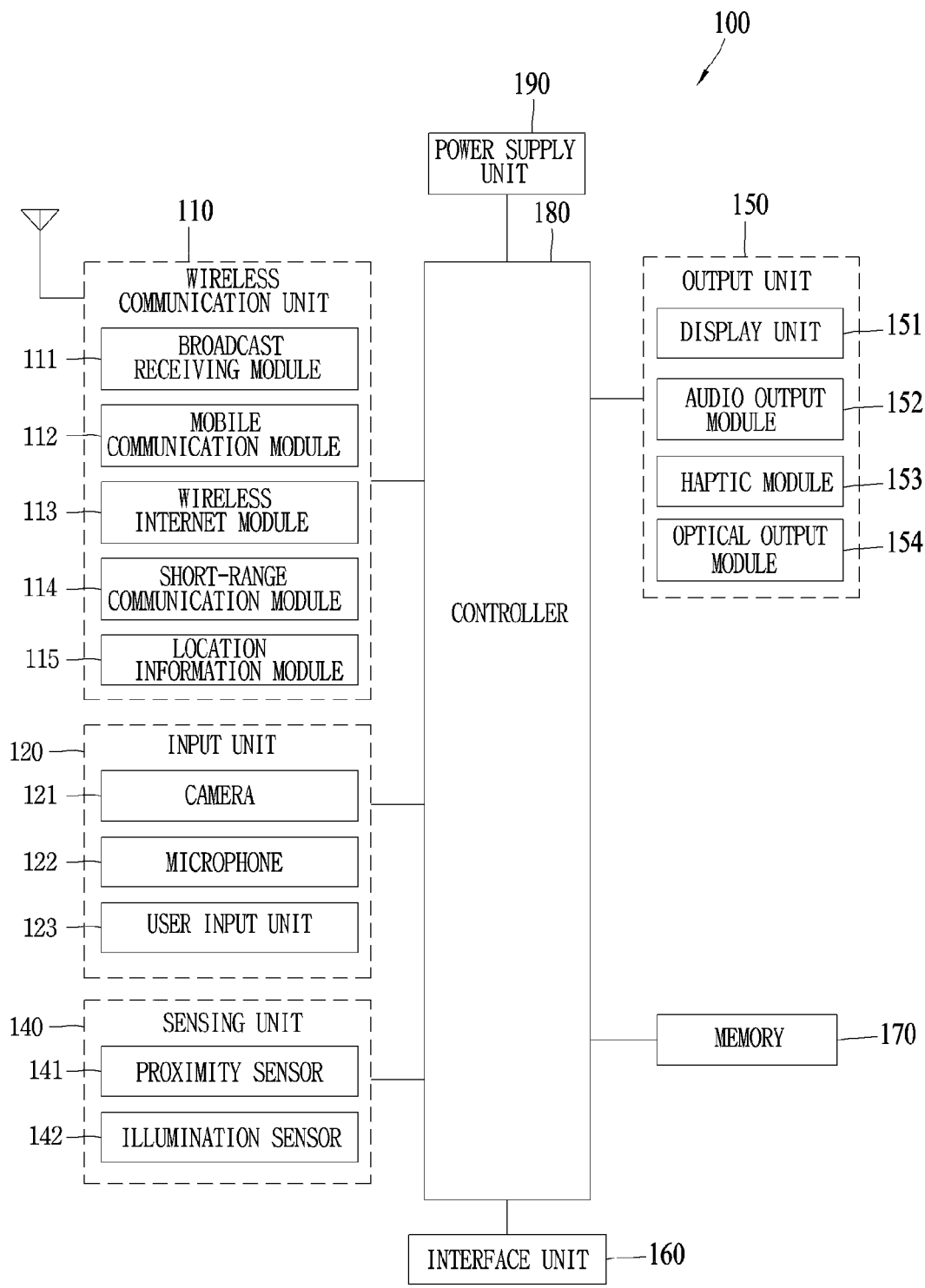
FIG. 1A is a block diagram of a mobile terminal in accordance with the present disclosure.
Figure 1B:
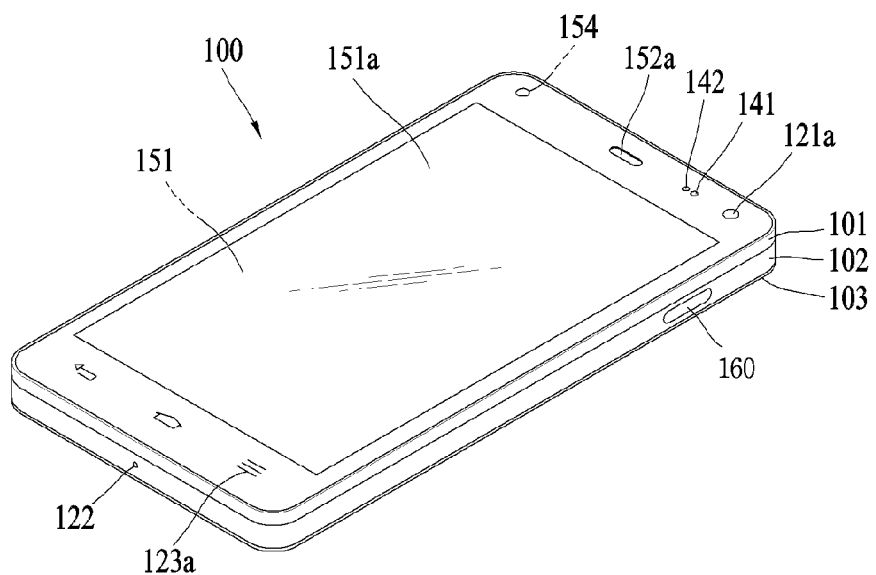
FIGS. 1B and 1C are conceptual views of one example of the mobile terminal, viewed from different directions.
Figure 1C:
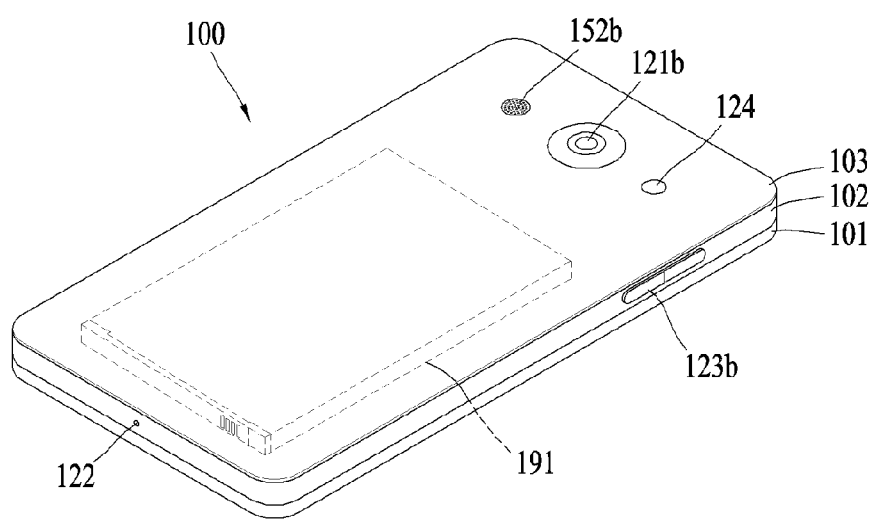

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity of explanation, assume that the mobile terminal 100 according to the present invention includes at least one of configuration elements shown in FIG. 1a to FIG. 1c. Specifically, it may be able to assume that the mobile terminal 100 according to the present invention includes a wireless communication unit 110, a camera 121, a microphone 122, a display unit 151, a memory 170 and a controller 180 among the configuration elements shown in FIG. 1a to FIG. 1c.

In embodiments described in the following, assume that the display unit 151 corresponds to a touch screen. If the display unit 151 corresponds to a touch screen, the display unit 151 may be able to function not only as an output device outputting information but also as an input device receiving a touch input. Yet, although the display unit 151 does not correspond to a touch screen, it is apparent that the embodiments described in the following are also applicable. In this case, a touch input can be replaced with a gesture input moving the mobile terminal 100 or a push input pushing a button mounted on the mobile terminal 100.

In the present specification, such a virtual search engine name as 'goagle', 'navar', 'bang' and the like are used to prevent from writing a specific company name or a brand name. It is apparent that the embodiments described in the following are also applicable to search engines (e.g., google, naver, bing and the like) actually used in a web browser.

The mobile terminal 100 according to the present invention can perform web search via a browser. Specifically, if a specific keyword is inputted, the controller 180 can control a web search result to be outputted in response to the inputted keyword.

If a user requests web search for a specific keyword, the controller 180 can perform web search via a search engine configured as a default. For example, if 'goagle', 'bang' 'navar' and the like are stored as a search engine and the goagle' is designated as a default search engine, the controller 180 can perform web search for a keyword inputted by a user via the 'goagle' search engine. Configuration of the default search engine can be manually controlled by a user.

A user can select a search engine to be used for web search. For instance, if 'goagle', 'bang' 'navar' and the like are stored as a search engine, the controller 180 can attempt to perform web search using at least one selected from the group consisting of a search engine of the 'goagle', a search engine of the 'bang' and a search engine of the navar'.

Figure 2A:
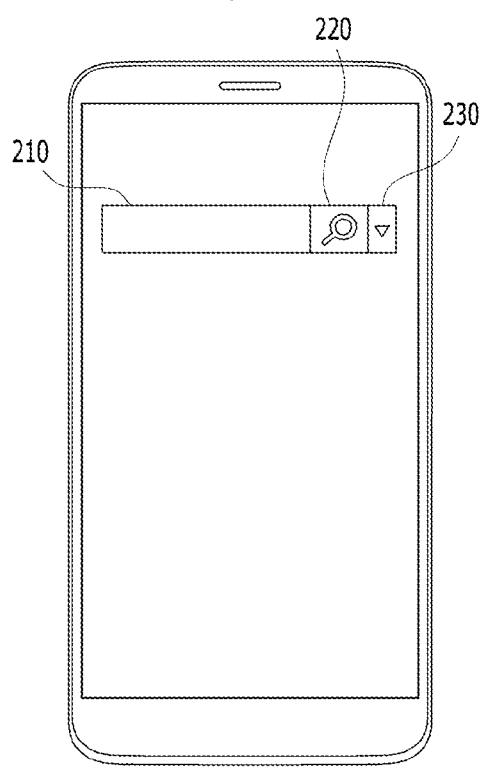
FIGS. 2A and 2B are diagrams for an example of a method of selecting a legacy search engine.
Figure 2B:
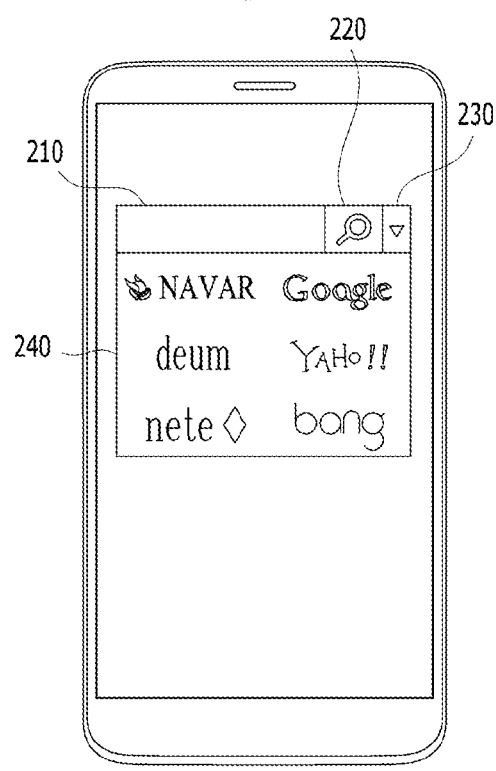

FIGS. 2A and 2B are diagrams for an example of a method of selecting a legacy search engine. If a keyword is inputted to a keyword input window 210 and a search button 220 is touched, the controller 180 can execute web search of the inputted keyword. In this case, as shown in FIG. 2A, if a drop down button 230 positioned in the vicinity of the search window 210 is touched, as shown in FIG. 2B, the controller 180 can control a list 240 of search engines capable of being selected to be outputted. If a search engine is selected from the list 240 of the search engines and the search button is touched, the controller can attempt to perform web search via the selected search engine. For instance, if the 'goagle' is selected as a search engine, the controller 180 can control a search result resulted from inputting a keyword to 'www.goagle.com' (or, m.goagle.com) to be displayed.

In the example mentioned earlier in FIGS. 2A and 2B, a search result of a desired keyword can be provided to a user via a preferable search engine only when a touch input process of three steps including a step (first step) of inputting a keyword, a step (second step) of selecting a search engine and a step (third step) of touching a search button is went through. In this case, if a user is requested to input many touch inputs, it may cause inconvenience of the user.

Hence, the present invention intends to propose a method capable of performing both inputting a keyword and selecting a search engine by a simplified touch input only. To this end, the controller 180 can control the display unit 151 to be divided into at least one or more virtual regions when an initial web browser is executed.

As an example, FIGS. 3A and 3B are diagrams for explaining a virtual region of a display unit. FIGS. 3A and 3B show an example that the display unit 151 includes 3 virtual regions. For clarity, the 3 virtual regions included in the display unit 151 are called a first region, a second region and a third region, respectively, in the following description. In this case, such a terminology affixed to a forepart as the first, the second and the third corresponds to a terminology for identifying each of the regions only.

If a pointer touches a first position of the display unit 151, the first region to the third region can be arranged like as shown in FIG. 3A. In this case, the first region may correspond to a region for selecting a search engine. In particular, if the pointer touching the display unit 151 is dragged to the first region, the controller 180 can control a list of search engines to be outputted.

The second region may correspond to a region for activating a microphone 122 and receiving a keyword input via the microphone 122. If the pointer touching the first region is dragged to the second region, the controller 180 activates the microphone 122 and may be able to convert audio inputted through the microphone 122 into text. Subsequently, the controller 180 considers an inputted text as a keyword and may be able to perform web search based on the keyword.

As a different example, the third region can be used for performing web search using an image. In this case, the web search using an image indicates that web search is performed using an image instead of a keyword. If an image via the web search is inputted, a search engine may be able to provide a search result for a person or an object included in the image or a search result for an image including the person or the object included in the image.

If a pointer touches a second position of the display unit 151, the first region to the third region can be arranged like as shown in FIG. 3B. In this case, the first region may correspond to a region for selecting a search engine. If a search engine is selected via the first region, the controller 180 can perform web search using a keyword identical to the keyword used in a previous web search via the selected search engine.

The second region may correspond to a region for adding a keyword of "AND" condition. The controller 180 can perform web search in a manner of binding the keyword used in the previous web search and a keyword added while the second region is touched with each other with the "AND" condition. If two keywords are bound by the "AND" condition, a search engine can provide a search result for web pages including the two keywords.

The third region may correspond to a region for adding a keyword of "NOT" condition. The controller 180 can perform web search in a manner of binding the keyword used in the previous web search and a keyword added while the second region is touched with each other with the "NOT" condition. If the keyword of the "NOT" condition is added on a keyword, the controller 180 can provide a search result for web pages including a first keyword and not including a second keyword (i.e., the keyword of "NOT" condition).

It is not necessary for each position of the first region to the third region to be fixed in a position. As shown in examples of FIG. 3A and FIG. 3B, arrangement of the first region to the third region may vary according to a position of the display unit 151 on which a pointer is touched. As an example, FIG. 3A shows an example that the first region to the third region are arranged from the top to the bottom as the pointer touches a first position (i.e., an upper edge of the display unit 151) of the display unit 151. FIG. 3B shows an example that the first region to the third region are arranged from the bottom to the top as the pointer touches a second position (i.e., a bottom edge of the display unit 151) of the display unit 151.

The first region to the third region can be arranged in a manner of being different from what is shown in FIGS. 3A and 3B. For example, the first region to the third region can be arranged at a fixed position all the time without considering a touch position of the display unit 151. As a different example, the first region to the third region can be arranged from the left to the right (or, from the right to the left). Or, the first region can be positioned at the top or bottom) of the second and the third region while the second region and the third region are horizontally positioned.

Moreover, it is not necessary for all of the first region to the third region to be included in the display unit 151. If one of the first region to the third region is not included in the display unit, a function configured to be performed according to a touch touched on the not included region can be omitted in the following description.

In an example shown in FIGS. 3A and 3B, if the first position or the second position is touched for more than prescribed time, the controller 180 can control the first region to the third region to be activated on the display unit. For example, if a pointer touching the first position or the second position less than the prescribed time is dragged to the first region to the third region, the embodiments described in the following are not applied. If a pointer touching the first position or the second position for more than the prescribed time is dragged to the first region to the third region, it may be able to apply the embodiments described in the following.

Based on the aforementioned explanation, the mobile terminal 100 according to the present invention is explained in more detail. Although a search engine is just software configured to search for information from a World Wide Web server or a FTP (file transfer protocol) server, a server providing a web search service using a search engine is also called a search engine in the embodiments described in the following.

Figure 4:
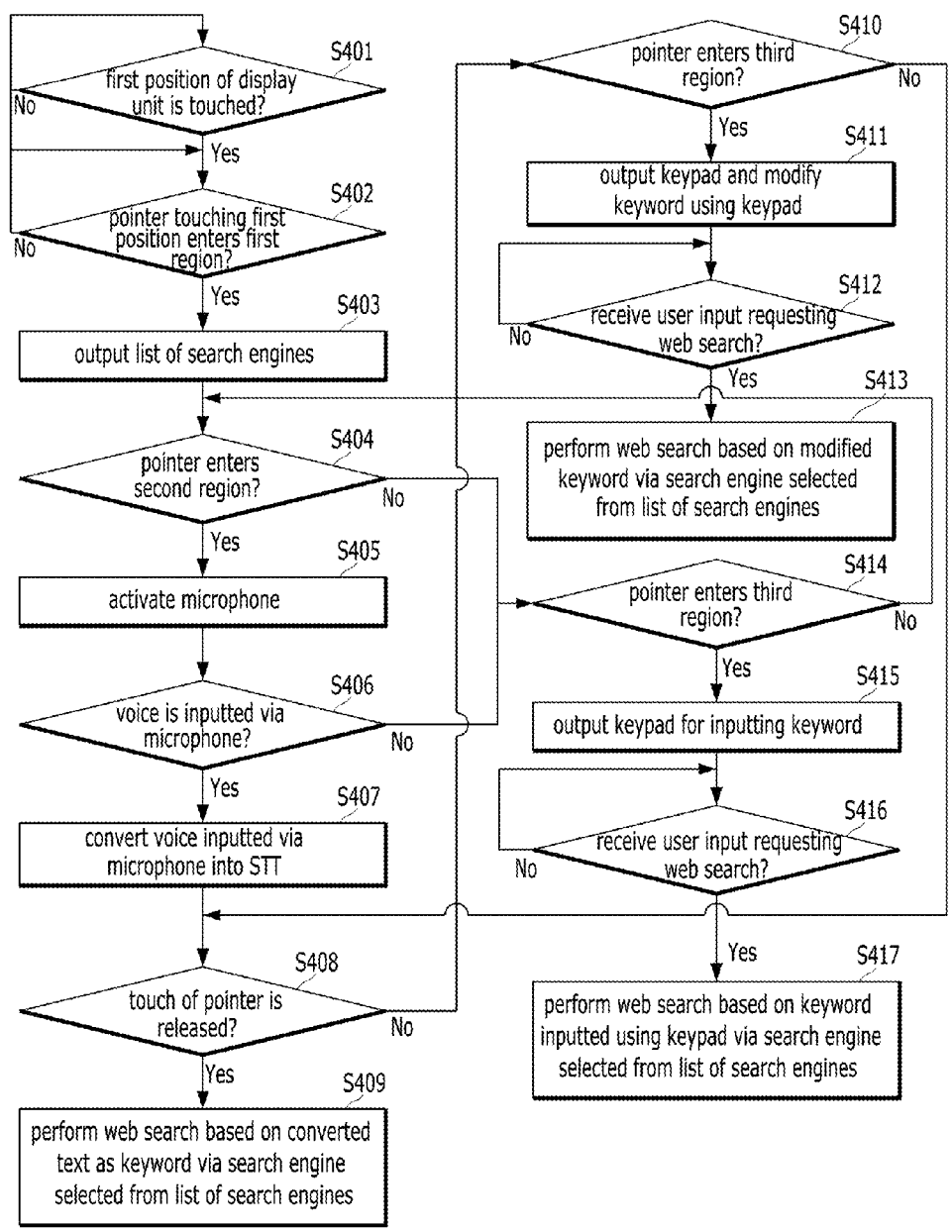
FIG. 4 is a flowchart for an operation of a mobile terminal 100 according to an example of the present invention.

FIG. 4 is a flowchart for an operation of a mobile terminal 100 according to an example of the present invention.

Referring to FIG. 4, first of all, if a touch input touching a predetermined first position of the display unit 151 is received [S401] and a user input of which a pointer touching the first position is dragged to a first region is received [S402], the controller can control a list of search engines capable of being selected to be outputted [S403]. In this case, the predetermined position of the display unit 151 may correspond to one selected from the group consisting of an edge (e.g., a boundary between the display 151 and a bezel) of the display unit 151, an edge of a web browser (e.g., a boundary between a position on which the web browser is outputted and a status bar or a boundary between the position on which the web browser is outputted and a navigation area on which a navigation button is outputted), an edge of a web page (e.g., a boundary between the web page and an address input window or a boundary between the web page and a navigation area), an outer area of one of the first region to the third region, and a region among the first region to the third region. For clarity of explanation, an upper edge (i.e., a boundary line at which an upper part of the display unit 151 and a bezel are in contact) of the display unit 151 is considered as the first position in the drawings described in the following.

If a touch input touching the predetermined first position of the display unit 151 is received, the controller 180 can distinctively display the first position to indicate that the first position is touched. For instance, if the first position corresponds to an edge of the display unit 151, an edge part at which the display 151 and a bezel are in contact can be displayed in a manner of being highlighted. As a different example, if the first position corresponds to a boundary between a web browser and a status bar, the boundary between the web browser and the status bar can be displayed in a manner of being highlighted. If the first position corresponds to a boundary between a web page and an address input window, the boundary between the web page and the address input window can be displayed in a manner of being highlighted. Moreover, the controller 180 can control at least one or more virtual regions (e.g., the first region to the third region) to be displayed in a manner of being visually identified.

Figure 5:
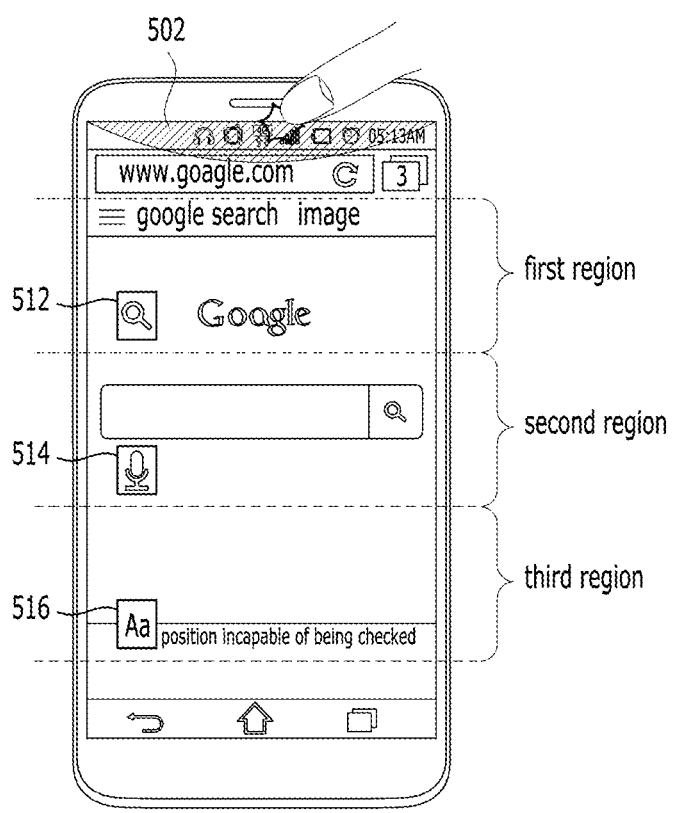
FIG. 5 is a diagram for an example of visually identifying virtual regions included in a display unit.

As an example, FIG. 5 is a diagram for an example of visually identifying virtual regions included in a display unit. If a user input touching an upper edge of the display unit 151 is received, the controller 180 can distinctively display the upper edge of the display unit to indicate that the upper edge of the display unit 151 is touched. FIG. 5 shows an example that an upper edge part 502 of the display unit 151 where the display unit 151 and a bezel are in contact is displayed in a manner of being highlighted. Moreover, as shown in an example of FIG. 5, the controller 180 can control an icon representing each region to be outputted. Referring to FIG. 5, an icon 512 indicating that a search engine is capable of being selected is outputted on a first region, an icon 514 indicating that the microphone 122 is to be activated is outputted on a second region and an icon 516 indicating that a keypad is to be outputted on a third region.

If a pointer touching a predetermined first position is dragged to the first region, the controller 180 can output a list of search engines capable of being selected. The list of the search engines capable of being selected can be edited by a user. For instance, when 'goagle' is selected as a default search engine, a user can add such a search engine as 'bang', 'navar' and the like to the list and may be able to delete at least one selected from the group consisting of the 'goagle', the 'band' and the 'navar' from the list. Moreover, a user can determine a search engine to be used as a default search engine among a plurality of search engines.

FIGS. 6A to 6C are diagrams for an example of displaying a list of search engines. If a pointer touching a predetermined first position is dragged to a first region, as shown in an example of FIG. 6A, the controller 180 can control a list of search engines to be outputted via the first region. The controller 180 can control the list of search engines to be outputted via the first region as soon as the pointer enters the first region. Or, the controller can control the list of search engines to be outputted only when the pointer entered the first region touches a random position of the first region for more than prescribed time.

FIG. 6A shows an example of displaying the list of search engines in horizontal direction. As shown in the example of FIG. 6A, if the search engines are horizontally arranged, the controller 180 can control a search engine, which is firstly configured as a default search engine, to be exposed to the center of the first region. By doing so, it may be able to provide a user with convenience capable of preferentially selecting the search engine configured as the default search engine.

When the list of search engines is outputted, a user can select a search engine in a manner of dragging a pointer on a search engine to be selected. For instance, as shown in an example of FIG. 6B, if a user drags a pointer on 'navar', the 'navar' can be selected as a search engine.

In this case, the controller 180 can control the search engine selected by the user to be visually and distinctively displayed. FIG. 6B shows an example that the search engine selected by the user is visually and distinctively identified in a manner of displaying a rectangular border around the search engine 612 selected by the user. It is apparent that the search engine selected by the user can be visually identified by a method different from the example shown in FIG. 6B.

The controller 180 can control search engines to be displayed via the first region within the predetermined number of search engines. For instance, FIGS. 6A and 6B shows an example that three search engines are outputted via the first region.

In this case, if the number of selectable search engines is greater than the predetermined number of search engines, the controller 180 can control scrolling of a list of search engines to be made by a user input. For example, if a pointer moves to either the left or the right of the first region or if the pointer touches the left or the right of the first region for more than prescribed time, as shown in an example of FIG. 6C, the controller 180 can control the list of search engines to be scrolled. A user can select a preferred search engine in a manner of scrolling the list of search engines.

If a touch of the pointer is released from the first region without being dragged to a second region or a third region, the controller 180 can move to a web page providing a selected search engine.

As an example, if such a search engine as 'goagle' is selected via the first region, the controller 180 can move to such a web site as 'www.goagle.com (or, m.goagle.com)' corresponding to the search engine 'goagle'.

If a pointer is dragged to the second region [S404] without being released from the first region, the controller 180 can control the microphone 122 to be activated [S405].

FIGS. 7A and 7B are diagrams for an example of activating a microphone 122. If a pointer touching a first region is dragged to a second region, the controller 180 can control the microphone 122 to be activated. The controller 180 can control the microphone 122 to be activated as soon as the pointer enters the second region. Or, the controller can control the microphone 122 to be activated only when the pointer, which has entered the second region, touches a random point on the second region for more than prescribed time.

If the microphone 122 is activated, the controller 180 can control information indicating the activation of the microphone 122 to be outputted via the second region. FIG. 7A shows an example that an image 712 indicating the activation of the microphone 122 is outputted via the second region.

When the microphone 122 is activated, if voice is inputted [S406], the controller 180 converts the inputted voice into texts and may be then able to control the converted texts to be outputted [S407]. FIG. 7B shows an example of outputting such a text 714 as 'Seoul' as a result of the voice conversion.

Subsequently, if a pointer touching the second region is released from the display unit 151 (i.e., if contact of the pointer is released from the display unit 151), the controller 180 deactivates the microphone 122 and may be able to perform web search using a keyword displayed on the second region via a search engine selected from the first region [S409].

FIGS. 8A to 8C are diagrams for an example of performing web search. If a pointer touching a second region is released from the display unit 151, the controller 180 can perform web search for a text, which is converted from voice inputted via the microphone 122 while the pointer is touching the second region, via a search engine selected by the pointer while touching the first region.

Specifically, as shown in an example of FIG. 8A and an example of FIG. 8B, assume that a search engine 'goagle' is selected from the first region and a text converted from voice, which is inputted while the second region is touched, corresponds to 'Seoul' 814. Subsequently, if the touch of the pointer is released from the second region, as shown in an example of FIG. 8C, the controller 180 can control a search result retrieved by such a keyword as 'Seoul' to be displayed via the search engine 'goagle' (i.e., 'www.goagle.com').

If a pointer is directly dragged to the second region from a predetermined first position or is dragged to the second region via the first region without selecting a search engine from the first region, the controller 180 can perform web search for a text, which is converted from voice inputted while the second region is touched, via a search engine configured as a default search engine.

When voice inputted via the microphone 122 while the second region is touched is converted into a text, a keyword different from an intention of a user can be selected due to surrounding noise, incorrect pronunciation of a user, an error of voice recognition and the like.

Hence, if a touch of the pointer touching the second region is not released from the display unit 151 [S408] and is dragged to a third region [S410], the controller 180 can control a keypad for modifying an inputted keyword to be outputted [S411].

As an example, FIGS. 9A to 9F are diagrams for an example of modifying a keyword. When a text 912 converted from voice, which is inputted via the microphone 122, is outputted, as shown in an example of FIGS. 9A and 9B, if a pointer moves to the third region from the second region, the controller 180 can control a keypad 920 for modifying a keyword to be outputted.

Figure 9A:
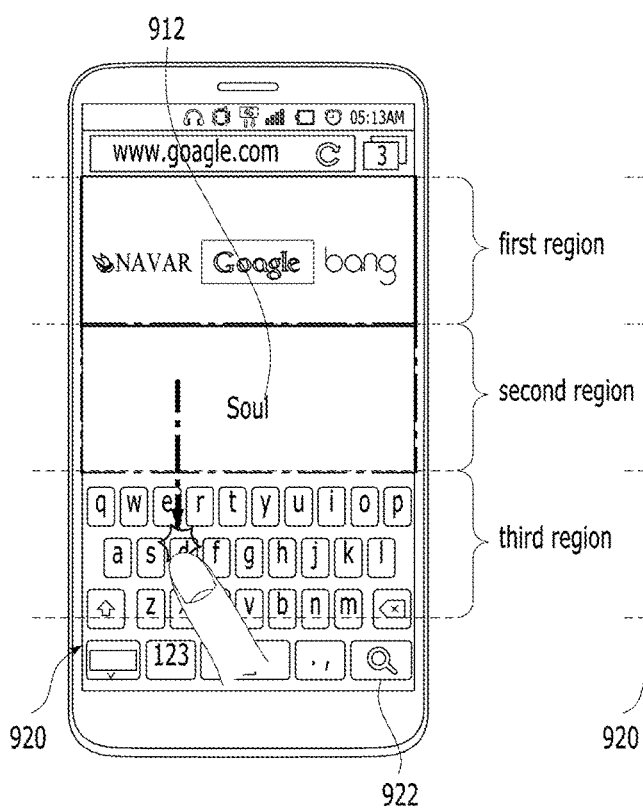
FIGS. 9A, 9B, 9C, 9D, 9E and 9F are diagrams for an example of modifying a keyword.
Figure 9B:
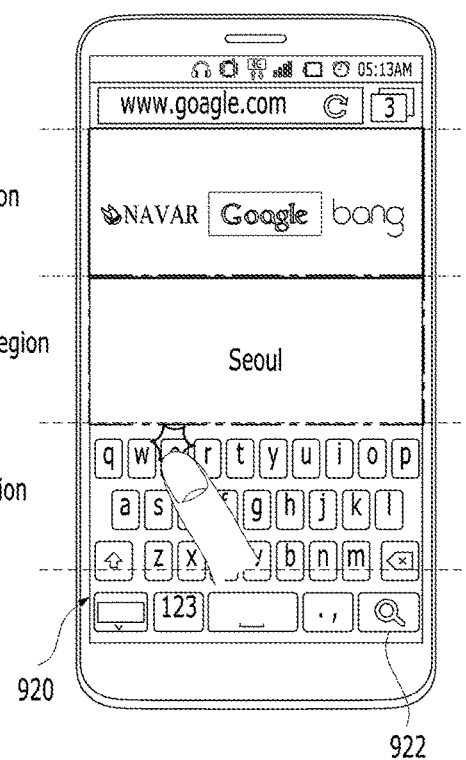

If a keyword intended to be inputted by a user via voice corresponds to 'Seoul' but a text 912 converted by voice recognition corresponds to 'Soul', as shown in an example of FIG. 9B, the 'Soul' can be modified into the 'Seoul' via the keypad by the controller 180.

In this case, if the pointer starts to move to the left and the right of the second region before the pointer is dragged to the third region from the second region, the controller 180 can control a cursor to be displayed on a currently outputted text to indicate a position to which a character is inputted. Moreover, the controller 180 can control a position of the cursor in response to the movement of the pointer dragged to the left and the right.

Figure 9C:
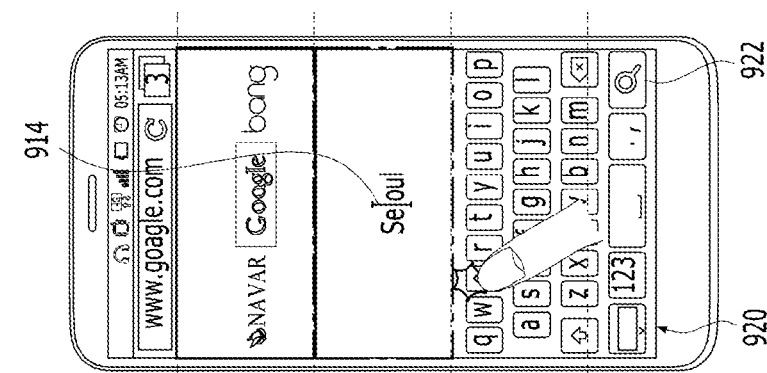

As an example, if a pointer touching the second region starts to move to the left or the right, as shown in an example of FIG. 9C, the controller 180 can control a cursor 914 to be displayed.

Figure 9D:
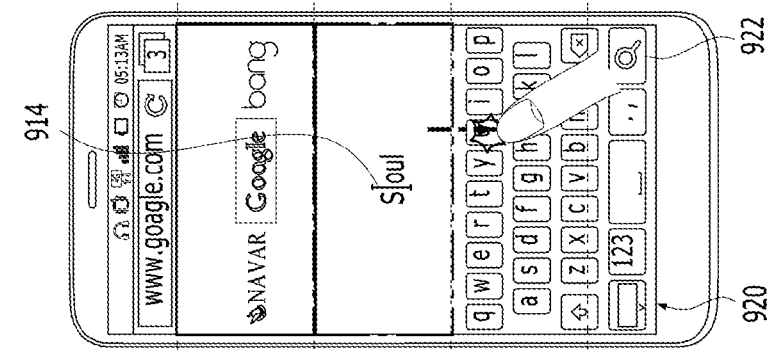

Subsequently, if the pointer is dragged to the left, as shown in an example of FIG. 9D, the controller 180 can move the cursor 914 to the left. Although it is not depicted, if the pointer is dragged to the right, the controller 180 can move the cursor 914 to the right.

Figure 9E:
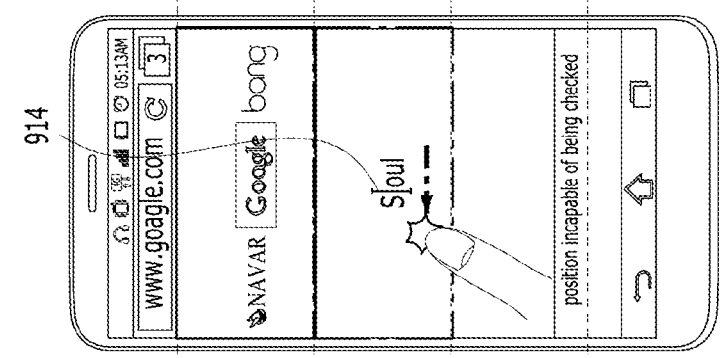
Figure 9F:
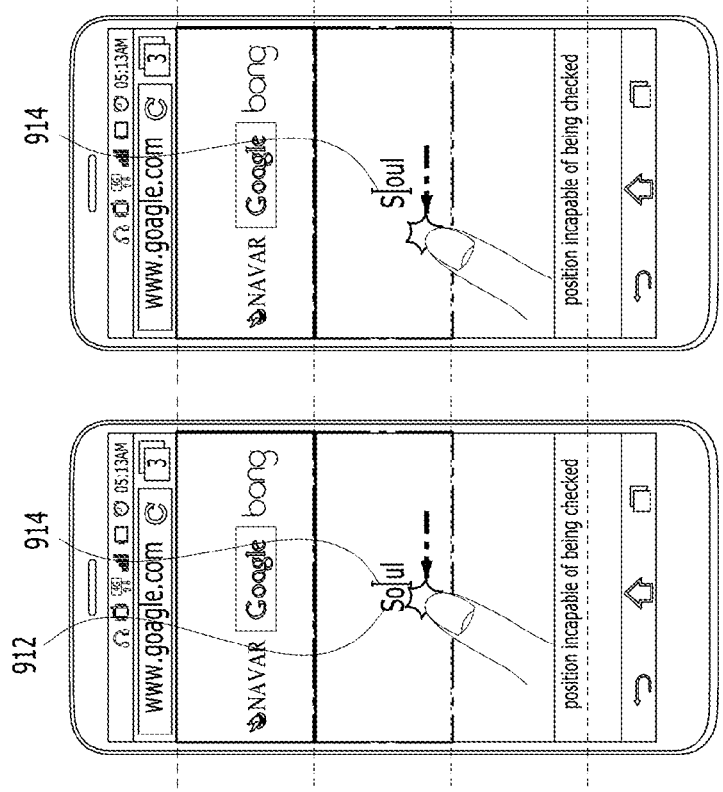

Subsequently, if the pointer is dragged to the third region from the second region, as shown in an example of FIG. 9E, the controller 180 can control a keypad 920 to be outputted. Subsequently, if a character is inputted via the keypad 920, the controller 180 can display the character in a position at which the cursor 914 is displayed. For example, as shown in an example of FIG. 9F, when the cursor 914 is positioned between 'S' and 'o', if 'e' key of the keypad 920 is touched, a character 'e' can be inserted between the 'S' and the 'o'.

FIGS. 9C to 9F shows an example that a keypad is outputted only when a pointer is dragged to the left or the right and then the pointer is dragged to the third region. As a different example, if a user input for dragging a pointer touching the second region to the left or the right is received and then the touch of the pointer is released from the second region, the controller 180 can also control the keypad to be outputted. In particular, if a user drags the pointer touching the second region to the left or the right, the controller determines it as the user intends to modify an inputted keyword and can control the keypad to be outputted irrespective of whether the pointer is dragged to the third region.

Subsequently, if a user input (e.g., a touch input touching a search button 922) for requesting web search is received [S412], the controller 180 can perform web search using a modified keyword [S413].

As a different example, if the pointer touching the second region is dragged to a prescribed direction in the second region, the controller 180 can delete a text converted from voice. Subsequently, the controller 180 converts voice newly inputted via the microphone 122 into a text and may be able to consider the converted text as a new keyword.

Figure 10A:
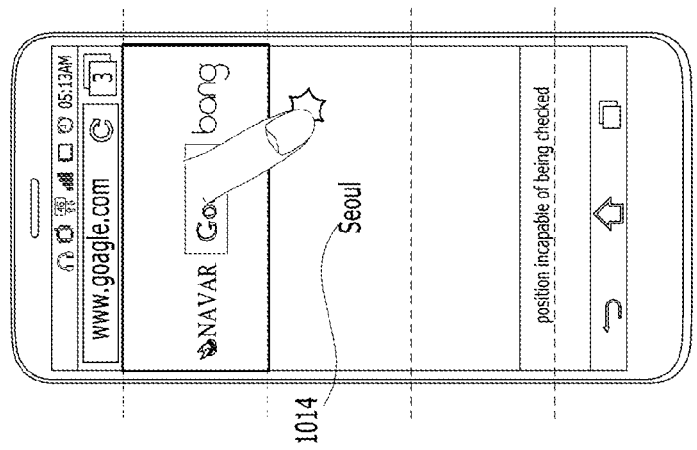
FIGS. 10A, 10B and 10C are diagrams for an example of deleting a text.
Figure 10B:
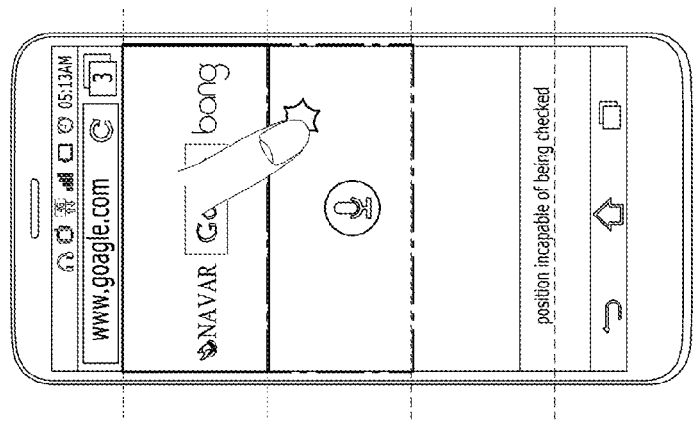
Figure 10C:
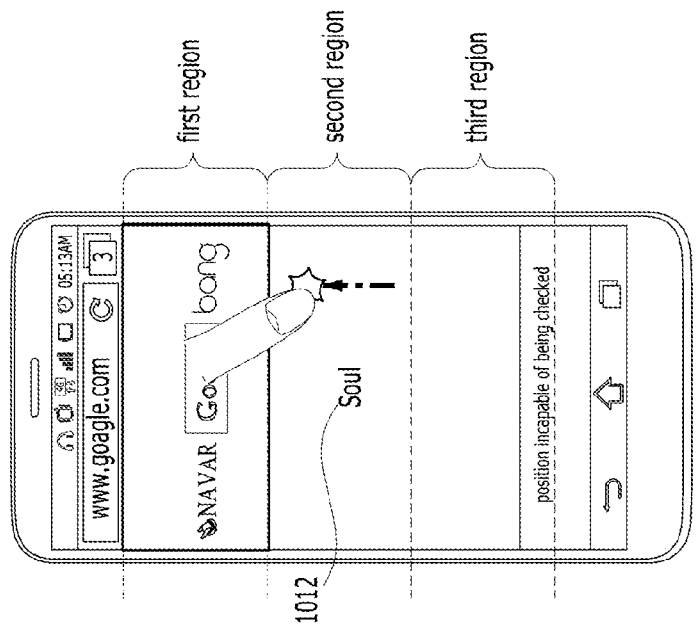

As an example, FIGS. 10A to 10C are diagrams for an example of deleting a text. While a text converted from voice is outputted, a touch of a pointer is not released and is dragged to a prescribed direction in a second region (In an example of FIG. 10A, the pointer moves to an up direction of the second region).

As shown in an example of FIG. 10B, the controller 180 can delete a text (In an example of FIG. 10A, 'Soul') 1012 converted from voice.

If the text is deleted, as shown in an example of FIG. 10C, the controller 180 can newly display a text converted from voice (In the example of FIG. 10C, 'Seoul' 1014). Subsequently, if the touch of the pointer is released from the second region, the controller 180 can attempt web search in a manner of considering the newly converted text (i.e., 'Seoul' 1014) as a keyword.

Unlike the example shown in FIGS. 10A to 10C, the controller 180 can control the microphone to be activated only when a text is deleted, the microphone is maintained as a deactivated state and a predetermined user input is received. For example, as shown in the example of FIG. 10A, if a pointer moves to a first direction (e.g., up direction) in the second region, the controller 180 deletes a text. If the pointer moves to a second direction (e.g., down direction) in the second region, the controller 180 can activate the microphone. By doing so, the controller can make a user newly input voice.

If the pointer moves to a third region from a first region or the pointer moves to the third region without configuring any keyword while touching the second region [S414], the controller 180 can control a keypad for inputting a keyword to be displayed [S415]. If the pointer moves to the third region from a predetermined region or the first region or if the pointer moves to the third region via the second region and no voice is inputted while the pointer touches the second region, a user can configure a keyword using the keypad, which is outputted according to the pointer dragged into the third region.

FIGS. 11A to 11C are diagrams for an example of outputting a keypad according to movement of a pointer dragged to a third region. If a pointer enters the third region, as shown in FIG. 11A, the controller 180 can control a keypad 1110 for inputting a keyword and a text input window 1120 for displaying a text inputted by the keypad to be outputted.

If a text is inputted by the keypad and a user input for requesting web search is received [S416], the controller 180 can control web search to be performed using a keyword inputted by the keypad via a search engine selected from a list of search engines [S417].

As an example, as shown in an example of FIG. 11B, when the keyword inputted by the keypad corresponds to 'Seoul', if a search button 1112 is touched, the controller 180 can perform web search based on the inputted text as a keyword as shown in an example of FIG. 11C.

As a different example, if a pointer touching the second region is dragged to the third region without being released from the display unit 151, the controller 180 can control menus for performing web search using an image to be outputted.

As an example, FIGS. 12A to 12H are diagrams for explaining an example of performing web search using an image. If a pointer enters the third region, the controller 180 can control a menu for selecting an image to be outputted to perform web search using the image. Specifically, as shown in an example of FIG. 12A, the controller 180 can control a camera icon 1212 for capturing a picture and a gallery icon 1214 for selecting an image stored in the memory 170 to be outputted.

If a pointer is dragged to the camera icon 1212 (or, if the pointer moves to the camera icon 1212 and a touch of the pointer is released), as shown in an example of FIG. 12B, the controller 180 activates the camera 121 and can control a preview image (i.e., an image inputted in real time via the camera 121 before a picture is captured) inputted via the camera 121 to be outputted. If a user input (or a touch input touching a capture button) dragging the pointer in a first direction is received while the preview image 1220 is outputted, the controller 180 can capture a picture. If picture taking is performed, the controller 180 performs capturing a picture and can control a captured picture 1230 to be outputted as shown in the example of FIG. 12C.

If the captured picture is not satisfactory to a user and a user input (e.g., a user input dragging the pointer to a second direction or a user input pushing a 'cancel' button) requesting a retake is received, as shown in an example of FIG. 12D, the controller 180 outputs the preview image 1220 and may be able to capture a picture again.

On the contrary, if a touch of the pointer is released from the display unit 151 (or, if a user input pushing a 'confirm' button is received), the controller 180 can control web search using the captured image to be performed. FIG. 12E is a diagram for an example of outputting a web search result using the captured image. If the captured image corresponds to a picture of a 'carrot', as shown in an example of FIG. 12E, it may be able to provide a user with a search result of images of which the 'carrot' is captured.

Unlike what is mentioned earlier with reference to FIGS. 12B to 12E, if the pointer touching the display unit 151 while the preview image is displayed is released, the controller 180 captures a picture and may be able to immediately perform web search using the captured picture.

Figure 12A:
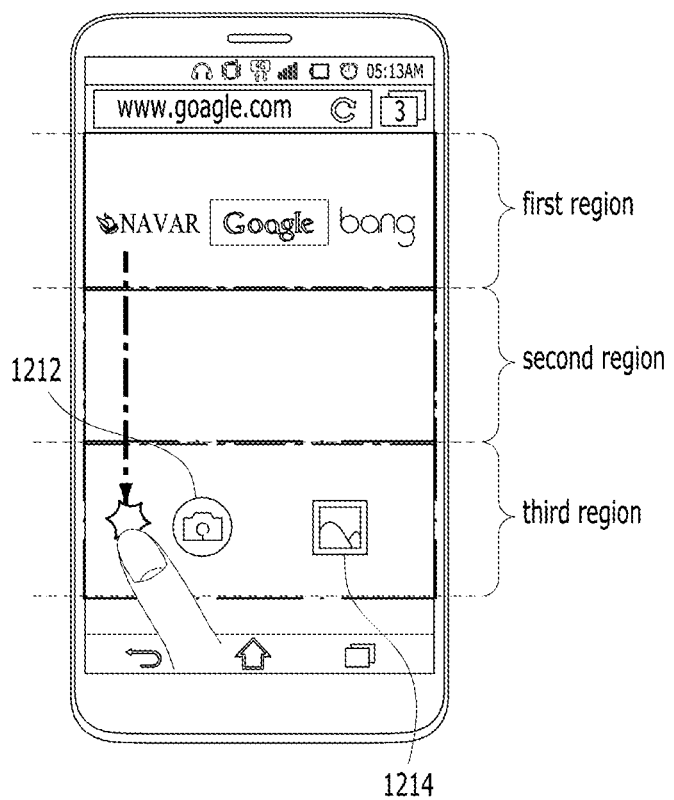
Figure 12H:
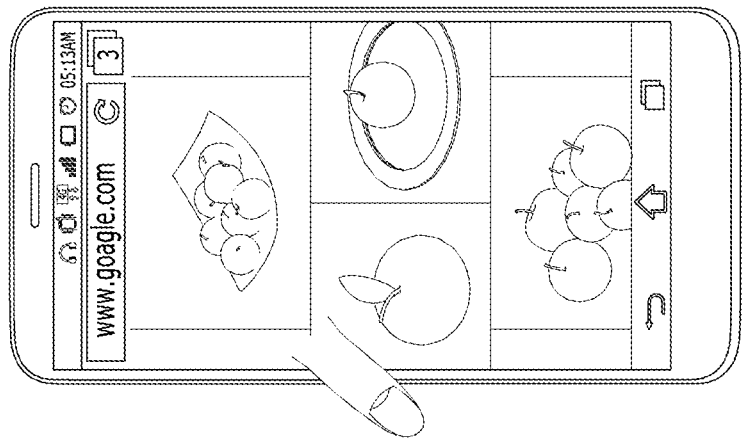
Figure 12G:
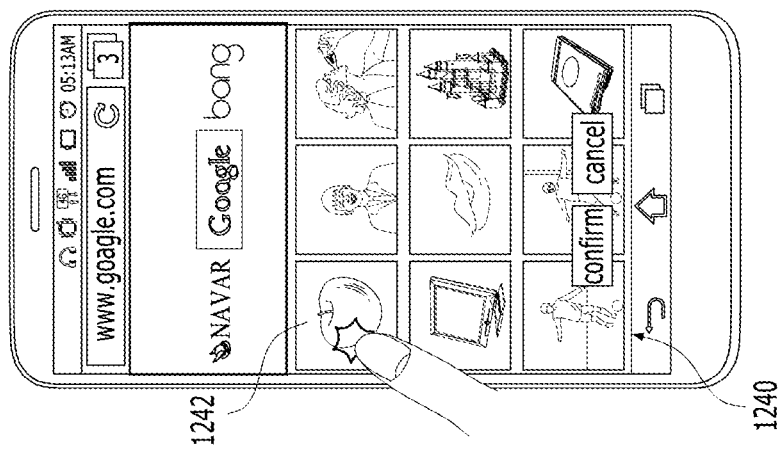
Figure 12F:
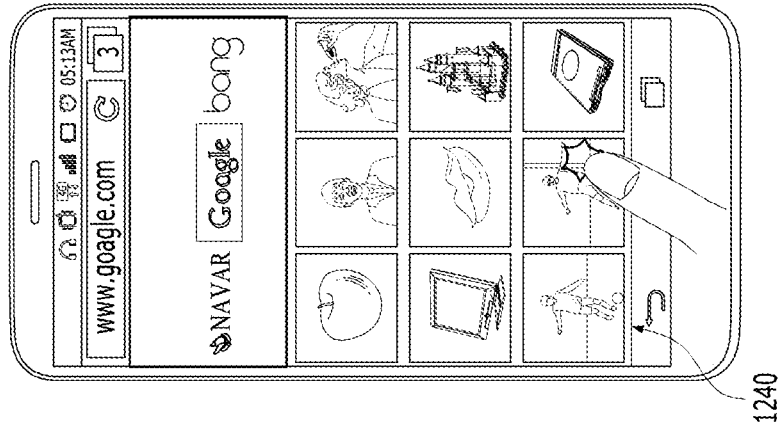

If the pointer is dragged to the gallery icon (or, if the pointer moves to the gallery icon and a touch of the pointer is released), as shown in an example of FIG. 12F, the controller 180 can control a list 1240 of images stored in the mobile terminal 100 to be outputted. A user can select a desired image in a manner of dragging and moving (or touching the desired image) the pointer on the desired image. FIG. 12G shows an example of selecting an image 1242 of which an apple is captured.

If the desired image is selected and the touch of the pointer is released (or, if a user input of selecting the desired image and pushing a 'confirm' button is received), the controller 180 can control web search using the selected image to be performed. FIG. 12H is a diagram for an example of outputting a web search result using the selected image. If the selected image 1242 corresponds to a picture of which an 'apple' is captured, as shown in an example of FIG. 12H, it may be able to provide a user with a search result of images of which 'apple' is captured.

If web search is performed based on an inputted text as a keyword, a search engine can provide the mobile terminal 100 with a web document search result or an image search result. In this case, the web document search result may correspond to a search result providing a web document including a keyword or web documents related to the keyword. The image search result may correspond to a search result providing an image included in a web document including a keyword or an image (e.g., a picture of an object (e.g., a person or an object) indicated by a keyword)

related to the keyword. Depending on a search engine, a map search result, a news search result, an SNS search result, a blog search result and the like can be additionally provided. As mentioned in the foregoing description, a search result of various categories for a keyword can be provided according to a search engine.

An order of providing the web document search result, the image search result and an integrated search result with which the web document search result and the image search result are mixed can be determined according to a policy of a search engine. Recently, the integrated search result with which the web document search result and the image search result are mixed is provided in general.

If a predetermined user input is received while one of search results of various categories is outputted, the controller 180 can control a search result of a different category to be outputted.

Figure 13A:
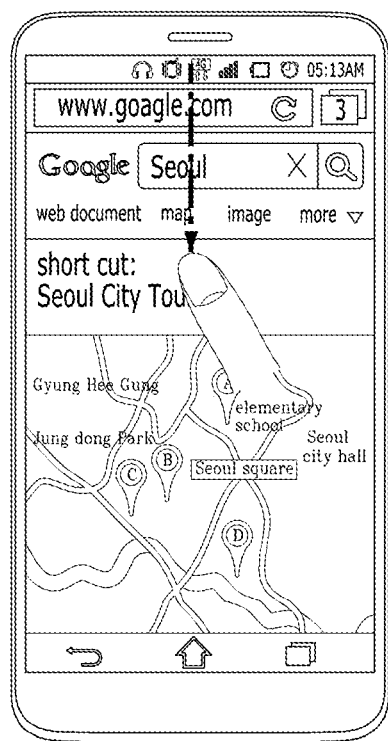
FIGS. 13A and 13B are diagrams for an example of outputting a search result of a different category in response to a predetermined user input.
Figure 13B:
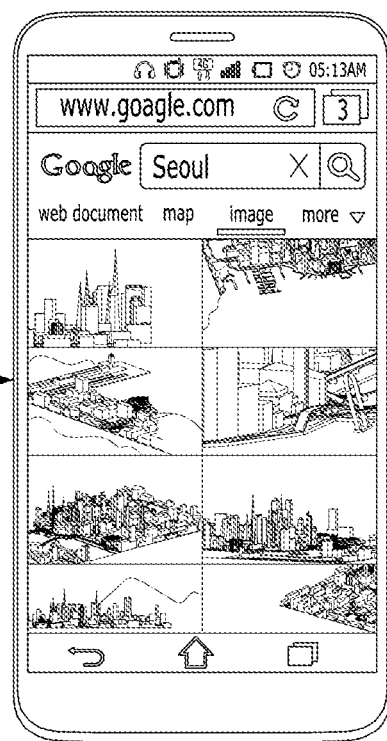

As an example, FIGS. 13A and 13B are diagrams for an example of outputting a search result of a different category in response to a predetermined user input. As shown in FIG. 13A, if a predetermined user input (in FIG. 13A, a flicking input flicking a pointer touching an upper part of the mobile terminal 100 in down direction) is received while a web document search result is outputted, the controller 180 can control a search result of a different category to be outputted. According to an example of FIG. 13B, an image search result is outputted in response to the flicking input.

According to the aforementioned description, if the pointer enters the third region, the controller 180 can output a keypad or a menu for performing web search using an image. Unlike what is mentioned earlier, if the pointer enters the third region, the controller 180 can control the menu for performing web search using an image to be outputted in a manner of additionally configuring a fourth region on the display unit 151. If the pointer enters the fourth region, the controller can control a keypad to be outputted. On the contrary, if the pointer enters the third region, the controller can control the keypad to be outputted. If the pointer enters the fourth region, the controller can control the menu for performing web search using an image to be outputted.

As a different example, if the pointer enters the third region, the controller 180 can determine whether to output the keypad or the menu for performing web search according to a category of a currently outputted search result.

Figure 14B:
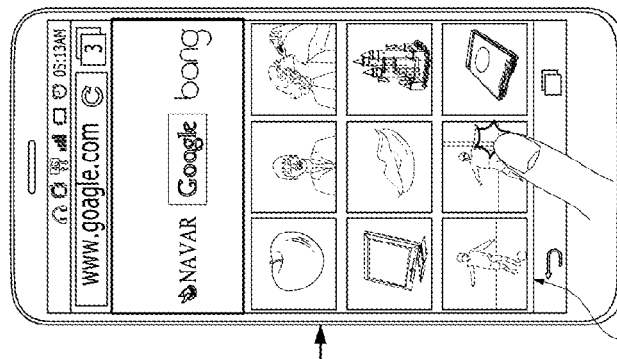
FIGS. 14A and 14B are diagrams for an example of an output of a mobile terminal in case that a pointer enters a third region.
Figure 14A:
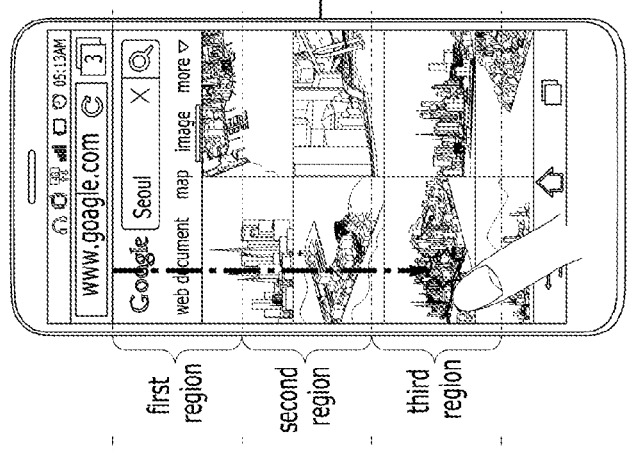

As an example, FIGS. 14A and 14B are diagrams for an example of an output of a mobile terminal 100 in case that a pointer enters a third region. If the pointer is dragged to the third region from a predetermined first position while a search result (e.g., a web document search result) of a different category except the image search result is outputted, as shown in an example of FIG. 14A, the controller 180 can control a keypad 1410 for performing web search using a keyword to be outputted. If a text is inputted using the keypad 1410, the controller 180 can perform web search based on the inputted text as a keyword.

If a pointer is dragged to the third region from a predetermined first position while an image search result is outputted, as shown in an example of FIG. 14B, the controller 180 can control a menu 1420 for performing web search using an image to be outputted. If a picture is captured or an image stored in the mobile terminal 100 is selected, the controller 180 can perform the web search using the image.

Figure 15:
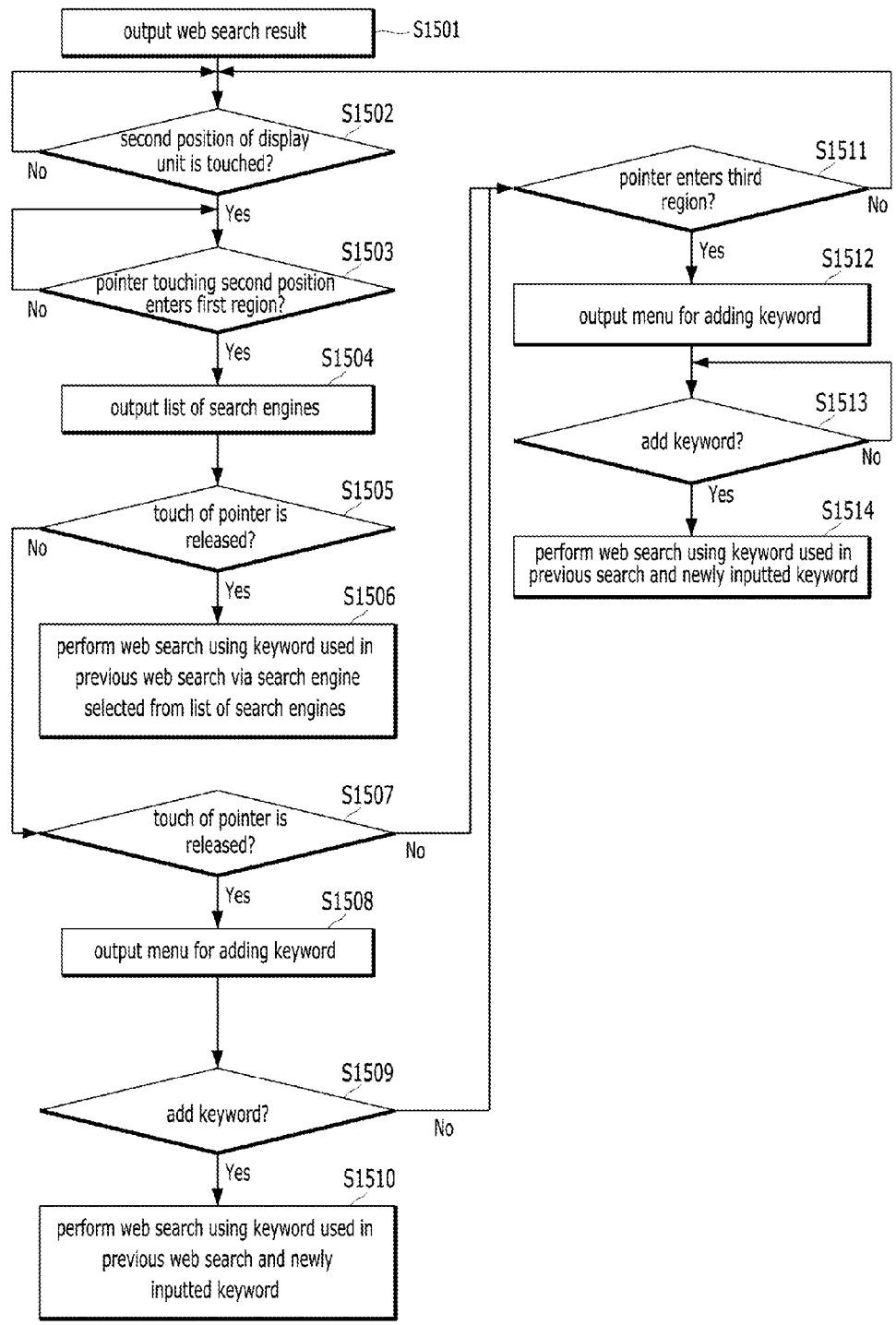
FIG. 15 is a diagram for explaining an example of an operation of a mobile terminal after web search is performed.

FIG. 15 is a diagram for explaining an example of an operation of a mobile terminal 100 after web search is performed. Embodiments described in the following with reference to FIG. 15 can be applied to steps appearing after the steps (S409, S413 and S417) performing web search mentioned earlier in FIG. 4.

While a web search result is outputted [S1501], if a user input that a pointer touches a predetermined second position of the display unit 151 [S1502] and is dragged to the first region is received [S1503], the controller 180 can control a list of selectable search engines to be outputted [S1504]. In this case, the predetermined second position of the display unit 151 may correspond to at least one selected from the group consisting of an edge (e.g., a boundary between the display unit 151 and a bezel) of the display unit 151, an edge of a web browser (e.g., a boundary between a position on which the web browser is outputted and a status bar or a boundary between the position on which the web browser is outputted and a navigation area on which a navigation button is outputted), an edge of a web page (e.g., a boundary between a position on which the web page is outputted and an address input window or a boundary between the position on which the web page is outputted and a navigation area on which a navigation button is outputted), an outer area of one of the first region to the third region, and a region among the first region to the third region. In this case, it may be preferable that the predetermined first position and the predetermined second position are different from each other. Yet, it is not mandatory. For clarity of explanation, assume that a bottom part boundary (i.e., a boundary line where an upper part of the display unit 151 and a bezel are in contact) of the display unit 151 corresponds to the second position in the following drawings.

If the second position is touched, the controller 180 can distinctively indicate that the second position is touched. For example, if the second position corresponds to an edge of the display unit 151, the edge of the display unit 151 where the display unit 151 and the bezel are in contact can be highlighted. If the second position corresponds to a boundary between a web page and a navigation area, the boundary between the web page and the navigation area can be highlighted.

Figure 16C:
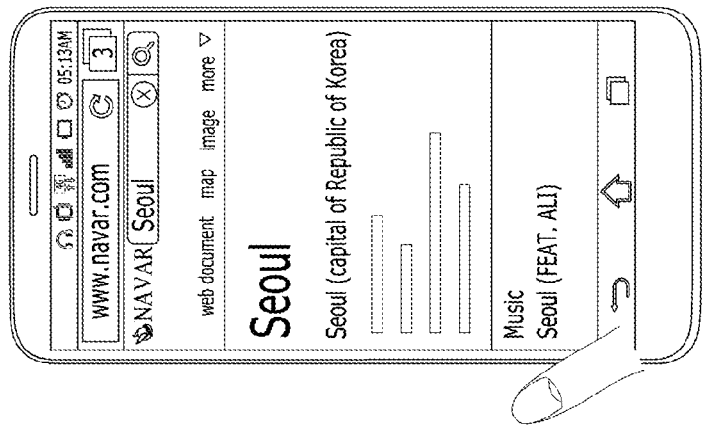
FIGS. 16A, 16B and 16C are diagrams for an example of displaying a list of search engines.
Figure 16B:
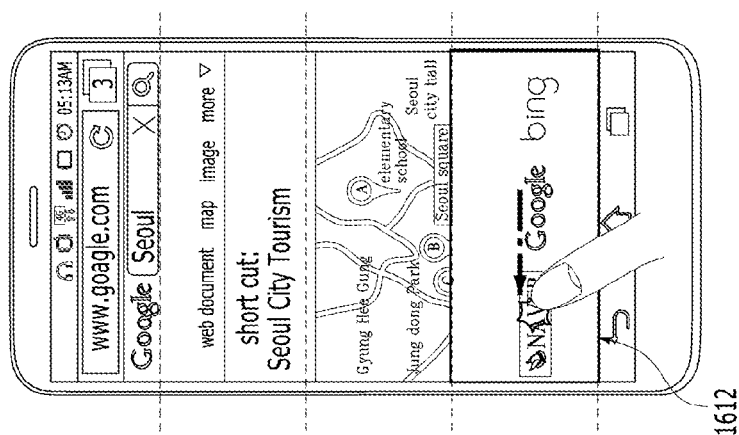
Figure 16A:
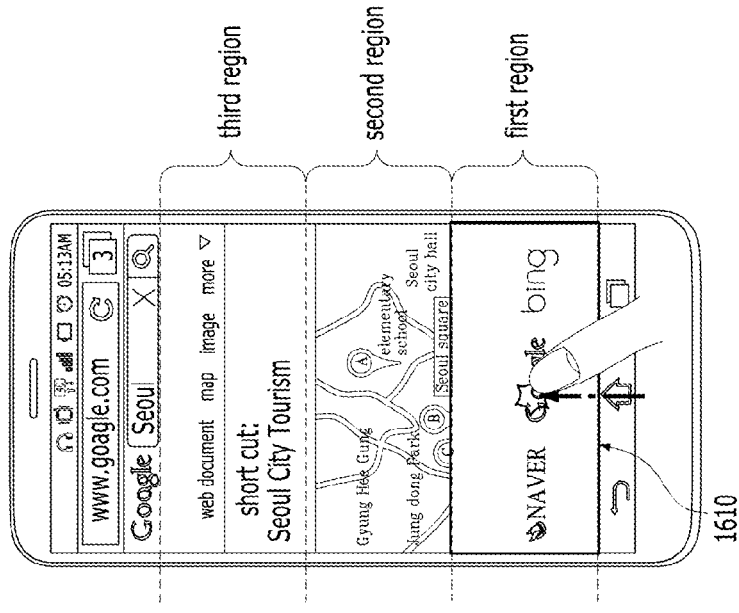

FIGS. 16A, 16B and 16C are diagrams for an example of displaying a list of search engines. If a pointer touching a predetermined second position is dragged to a first region, as shown in an example of FIG. 16A, the controller 180 can control a list 1610 of search engines to be outputted via the first region. The controller 180 can control a search engine to be outputted via the first region as soon as the pointer enters the first region or can control the list 1610 of search engines to be outputted only when the pointer, which has entered the first region, touches a random point on the first region for more than prescribed time.

FIG. 16A shows an example of displaying the list 1610 of search engines in horizontal direction. As shown in the example of FIG. 16A, if the search engines are displayed in a manner of being horizontally arranged, the controller 180 can control a search engine initially configured as a default search engine to be exposed to the center of the first region. By doing so, it may be able to provide a user with convenience capable of preferentially selecting the search engine configured as the default search engine.

If the list 1610 of search engines is outputted, a user can select a search engine in a manner of dragging a pointer on a search engine intended to be selected. For example, as shown in an example of FIG. 16B, if a user drags and moves the pointer on 'navar', the 'navar' can be selected as a search engine. In this case, as mentioned earlier in FIGS. 6A to 6C, the search engine 1612 selected by the user can be visually and distinctively displayed.

Moreover, if the number of selectable search engines is greater than the number of search engines capable of being displayed on the first region, as mentioned earlier in FIGS. 6A to 6C, a list of search engines can be scrolled by a user input.

After a search engine is selected, if the touch of the pointer is released (i.e., the pointer touching the display unit 151 is separated from the display unit 151) [S1505], the controller 180 can search for a keyword of previously performed web search again via the selected search engine [S1506].

As an example, when a search result, which is resulted from performing web search for such a keyword as 'Seoul' via 'goagle' search engine, is outputted, as shown in examples of FIGS. 16A and 16B, if a second position is touched and 'navar' search engine is selected, as shown in FIG. 16C, the controller 180 can control a search result, which is resulted from performing web search for such a keyword as 'Seoul' via the 'navar' search engine, to be outputted (i.e., a result of searching for such a keyword as 'Seoul' in 'www.navar.com').

In this case, in order to notify a keyword to be retrieved by the selected search engine, as shown in FIGS. 16A and 16B, the controller 180 can control a keyword used in previous web search to be outputted.

If the touch of the pointer is not released and is dragged to the second region [S1507], the controller 180 can control a menu capable of adding a keyword to be outputted [S1508]. If a keyword is added [S1509], the controller 180 can perform web search in a manner of binding the keyword used in the previous web search and the newly added keyword with each other by "AND" condition [S1510].

Figure 17A:
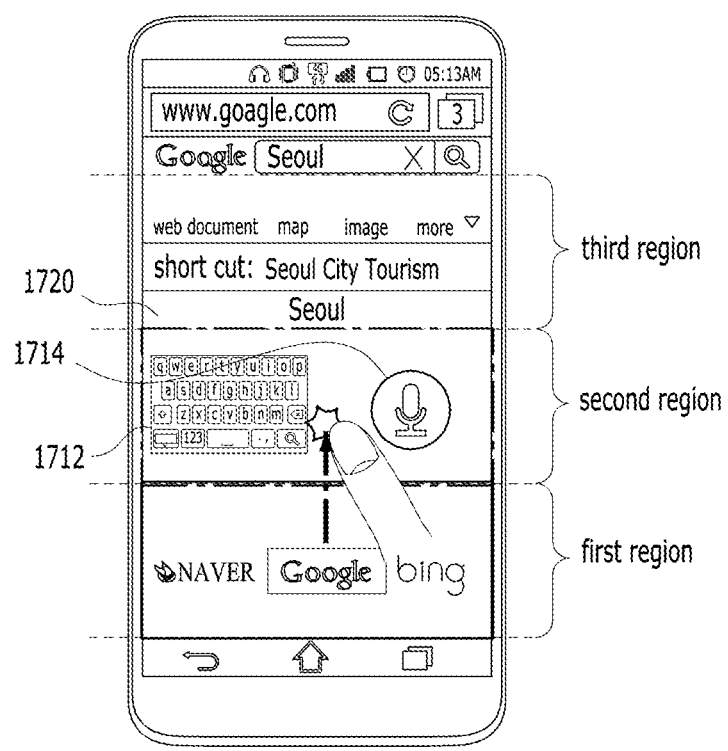

As an example, FIGS. 17A to 17G are diagrams for an example of outputting a menu for adding a keyword. If a pointer is dragged to the second region from the first region, as shown in an example of FIG. 17A, the controller 180 can control an icon representing an input means capable of adding a keyword to be outputted. FIG. 17A shows an example of outputting a keypad icon and a microphone icon. The controller 180 can control a keyword 1720 used in previous web search to be outputted while the keypad icon 1712 and the microphone icon 1714 are outputted.

If the pointer moves to the keypad icon 1712 (or, if the pointer moves to the keypad icon 1712 and a touch of the pointer is released), as shown in an example of FIG. 17B, the controller 180 can control a keypad 1730 for adding a keyword to be outputted. If a user inputs a keyword via the keypad 1730, the controller 180 can display a keyword used in previous web search and a keyword newly inputted by the keypad. FIG. 17C shows an example of displaying a keyword 'Seoul' used in the previous web search and a keyword 'Tokyo' newly inputted via the keypad in a manner of biding the keywords with each other using such a punctuation mark as '&'.

Subsequently, if a user touches a search button 1732, the controller 180 can perform web search using the keyword used in the previous web search and the newly inputted keyword. As an example, the controller 180 can ask a search engine to perform web search including both the keyword 'Seoul' and the keyword 'Tokyo'. In doing so, as shown in an example of FIG. 17D, it may be able to output a search result of web documents including both the 'Seoul' and the 'Tokyo'.

If the pointer moves to the microphone icon 1714 (or, if the pointer touches the microphone icon 1714 and prescribed time elapses), the controller 180 activates the microphone 122 and can control an indicator 1740 indicating that the microphone 122 is activated to be outputted via the second region as shown in an example of FIG. 17E.

If voice is inputted while the microphone 122 is activated, the controller 180 converts the voice into a text and may be able to display a keyword used in previous web search and a keyword newly inputted via the voice. FIG. 17F shows an example of displaying a keyword 'Seoul' used in the previous web search and a keyword 'Tokyo' newly inputted via the keypad in a manner of biding the keywords with each other using such a punctuation mark as '&'.

Subsequently, if a touch of the pointer is released from the second region, the controller 180 can perform web search using the keyword used in the previous web search and the newly inputted keyword. FIG. 17G shows an example of outputting a search result of web documents including both the 'Seoul' and the 'Tokyo'.

If the previously performed web search corresponds to web search using an image, the controller 180 can control a menu for adding an image to be outputted instead of a menu for outputting a keyword when the pointer enters the second region.

Figure 18A:
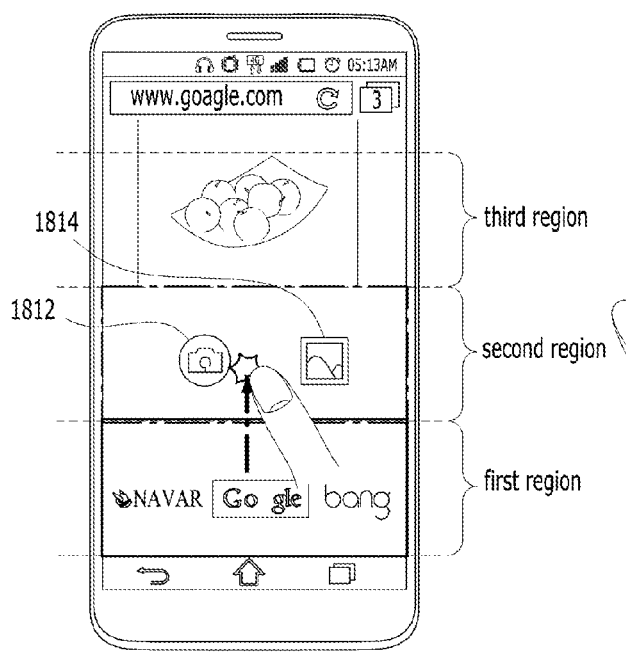
FIGS. 18A and 18B are diagrams for an example of outputting a menu for adding an image.
Figure 18B:
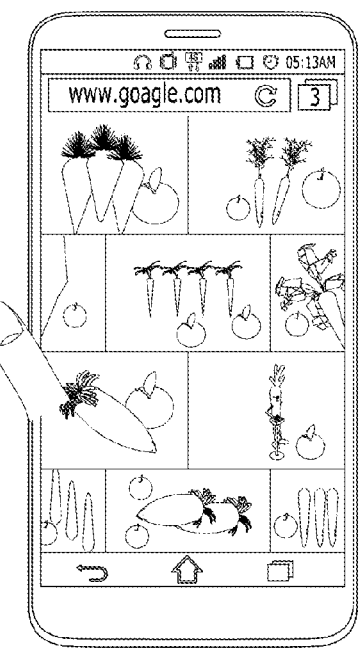

As an example, FIGS. 18A and 18B are diagrams for an example of outputting a menu for adding an image. If a pointer is dragged to the second region from the first region, as shown in an example of FIG. 18A, the controller 180 can control a menu for adding an image to be outputted. FIG. 18A shows an example of outputting a camera icon 1812 for adding an image via picture taking and a gallery icon 1814 for adding an image stored in the memory 170. Since an example of capturing a picture via the camera icon 1812 and an example of selecting an image via the gallery icon 1814 are identical to what is mentioned earlier in FIGS. 12A to 12H, detail explanation on the examples is omitted at this time.

If a picture is newly taken or a new image is selected, the controller 180 can perform web search in a manner of binding an image used in previous web search and the newly taken picture or the newly selected image with each other using "AND" condition.

As an example, if the image used in the previous web search corresponds to a picture of which an 'apple' is captured and the newly added image corresponds to a picture of which a 'carrot' is captured, as shown in an example of FIG. 18B, it may be able to provide a user with a result of searching for pictures of which both the apple and the carrot are captured.

If the pointer moves to the third region from the first region or the pointer touching the second region moves to the third region without adding any keyword [S1511], the controller 180 can control a menu for adding a keyword to be outputted [S1512].

Figure 19A:
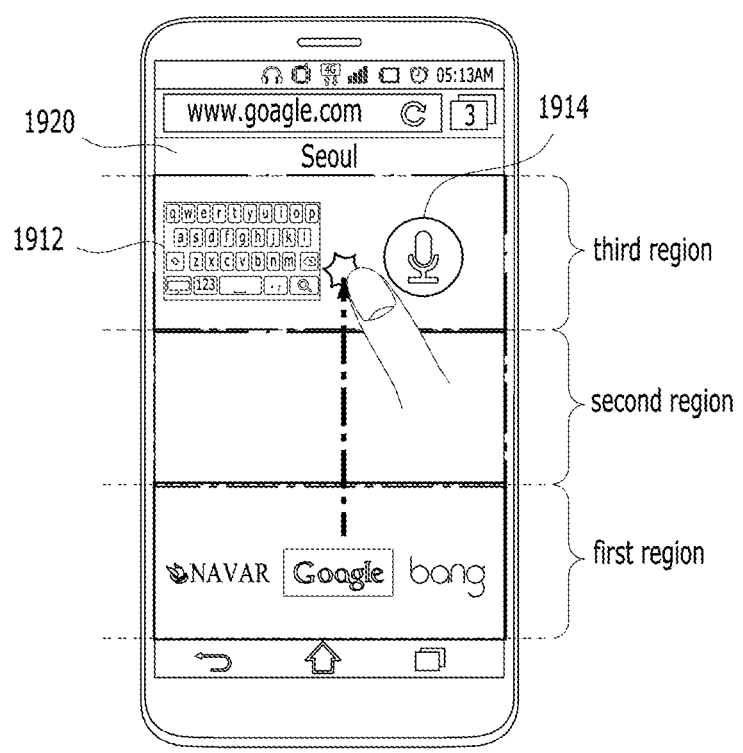

As an example, FIGS. 19A to 19E are diagrams for an example of outputting a menu for adding a keyword. If a pointer is dragged to the third region from the first region, as shown in an example of FIG. 19A, the controller 180 can control an icon representing an input means capable of adding a keyword to be outputted. FIG. 19A shows an example of outputting a keypad icon 1912 and a microphone icon 1914. The controller 180 can control the keyword 1920 used in previous web search to be outputted while the keypad icon 1912 and the microphone icon 1914 are outputted.

Figure 19B:
Figure 19C:

If the pointer moves to the keypad icon 1912 (or, if the pointer moves to the keypad icon 1912 and a touch of the pointer is released), as shown in an example of FIG. 19B, the controller 180 can control a keypad 1930 for adding a keyword to be outputted. If a user inputs a keyword via the keypad 1930, the controller 180 can display the keyword used in the previous web search and the keyword newly inputted via the keypad 1930. FIG. 19C shows an example of displaying 'NOT' between the keyword used in the previous web search 'Seoul' and the keyword newly inputted via the keypad 'Tokyo'.

Subsequently, after the keyword is added [S1513], if a user input (e.g., a touch input touching a search button 1932) for requesting web search is received, the controller 180 can perform web search in a manner of adding the "NOT" condition of the newly inputted keyword to the keyword used in the previous web search [S1514]. As an example, the controller 180 can ask a search engine to perform web search including the keyword 'Seoul' but not including the keyword 'Tokyo'.

If the pointer moves to the microphone icon 1914 (or, if the pointer touches the microphone icon 1914 and prescribed time elapses), the controller 180 activates the microphone 122 and can control an indicator 1940 indicating that the microphone 122 is activated to be outputted via the second region as shown in an example of FIG. 19D.

If voice is inputted while the microphone 122 is activated, the controller 180 converts the voice into a text and may be able to display a keyword used in previous web search and a keyword newly inputted via the voice. FIG. 19E shows an example of displaying 'NOT' between a keyword 'Seoul' used in the previous web search and a keyword 'Tokyo' newly inputted via the keypad [S1920].

Subsequently, if a touch of the pointer is released from the second region, the controller 180 can perform web search in a manner of adding the "NOT" condition of the newly inputted keyword to the keyword used in the previous web search.

If the previously performed web search corresponds to web search using an image, the controller 180 can control a menu for adding an image to be outputted instead of a menu for outputting a keyword when the pointer enters the second region.

Figure 20:
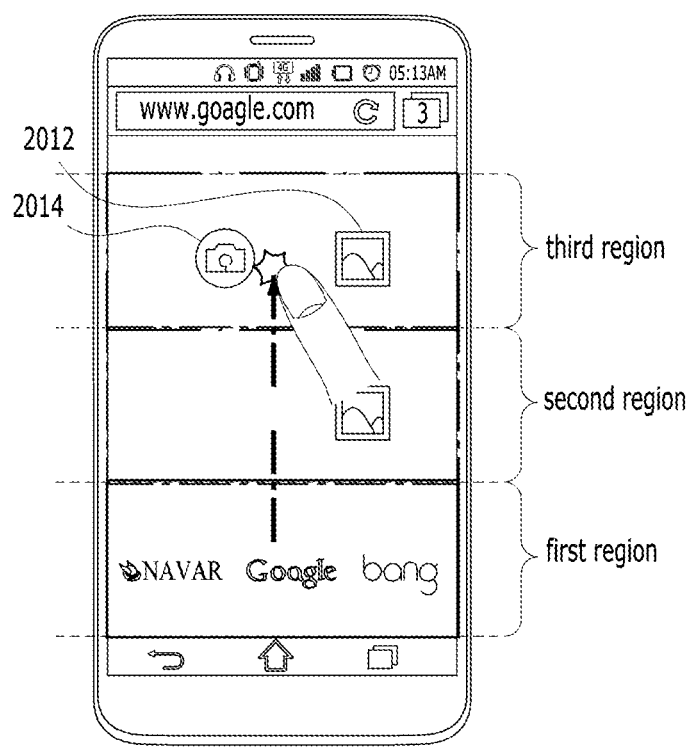
FIG. 20 is a diagram for an example of outputting a menu for adding an image.

As an example, FIG. 20 is a diagram for an example of outputting a menu for adding an image. If a pointer is dragged to the second region from the first region, as shown in an example of FIG. 20, the controller 180 can control a menu for adding an image to be outputted. FIG. 20 shows an example of outputting a camera icon 2012 for adding an image via picture taking and a gallery icon 2014 for adding an image stored in the memory 170. Since an example of capturing a picture via the camera icon 2012 and an example of selecting an image via the gallery icon 2014 are identical to what is mentioned earlier in FIG. 12, detail explanation on the examples is omitted at this time.

If a picture is newly taken or a new image is selected, the controller 180 can perform web search in a manner of adding "NOT" condition of the newly taken picture or the newly selected image to an image used in the previous web search.

As an example, if the image used in the previous web search corresponds to a picture of which an 'apple' is captured and the newly added image corresponds to a picture of which a 'carrot' is captured, a search engine may be able to provide a user with a search result that the picture of which the carrot is captured is excluded from the picture of which the apple is captured.

Figure 21C:
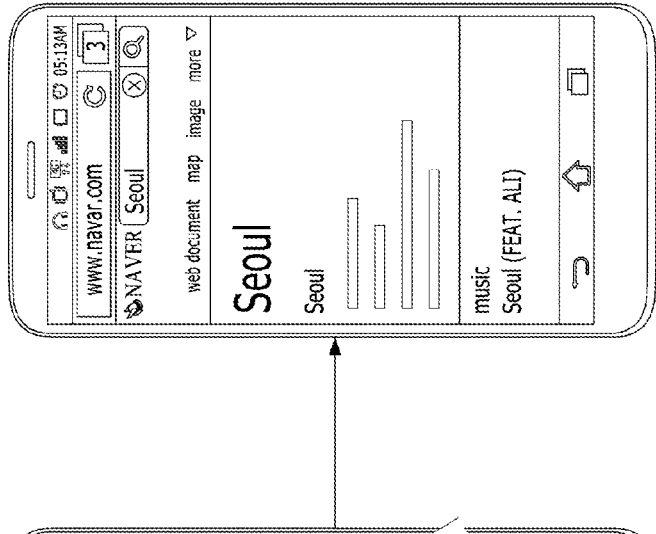
FIGS. 21A, 21B and 21C are diagrams for an example of providing a user with a web search result in a manner of dividing the web search result into a plurality of pages.
Figure 21B:
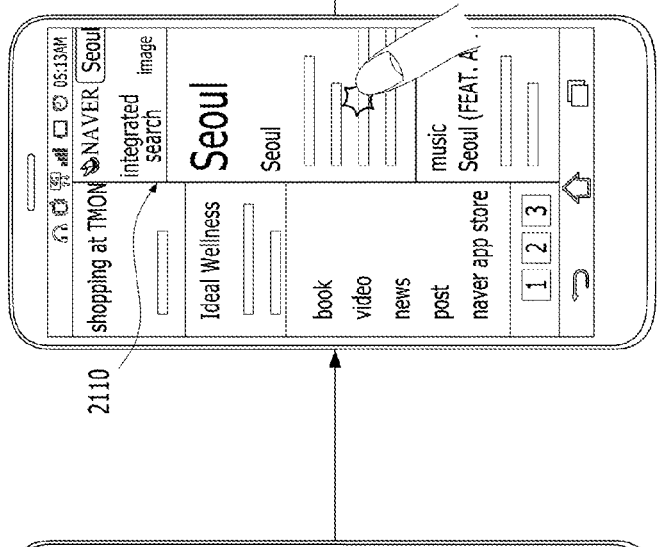
Figure 21A:
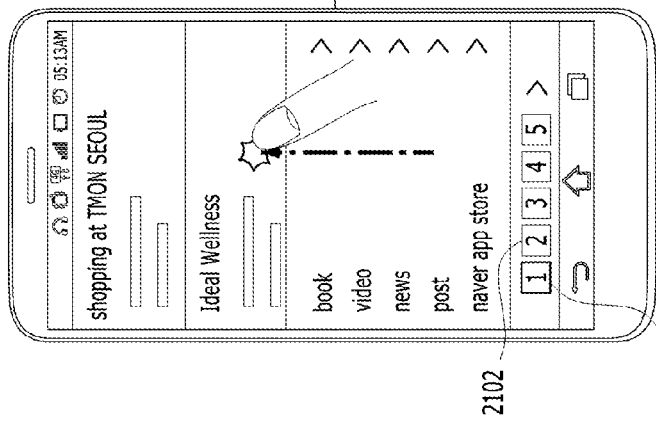

If many items (e.g., the number of retrieved web pages, the number of retrieved images and the like) are retrieved by web search, a search engine can provide a user with a web search result in a manner of dividing the web search result into a plurality of pages. As an example, FIGS. 21A to 21C are diagrams for an example of providing a user with a web search result in a manner of dividing the web search result into a plurality of pages. In an example shown in FIG. 21A, if the button marked '1' 2101 is selected, a search engine provides a user with an amount corresponding to a first page among the web search result. If the button marked '2' 2102 is selected, a search engine provide a user with an amount corresponding to a second page among the web search result.

If a predetermined user input is outputted while a search result for a specific page is outputted, the controller 180 can ask a search engine to provide a search result for a next page of the specific page or a search result for a previous page of the specific page.

For example, if a touch input for dragging a pointer in first direction on the display unit 151 is inputted while a first page of a search result is outputted, as shown in an example of FIG. 21B, the controller 180 can control a part 2110 of a second page to be displayed on the first page in a manner of being overlapped with the first page.

Subsequently, if prescribed time elapses without inputting an additional touch input on the display unit 151 or the second page, which is displayed on the first page in a manner of being overlaid, is touched, as shown in an example of FIG. 21C, the controller 180 can control the second page of the search result to be outputted.

On the contrary, if the first page is touched while the second page is displayed on the first page in a manner of being overlaid, the controller 180 stops outputting the second page and can control the first page to be continuously outputted.

Although it is not depicted in the drawing, if the pointer is dragged in second direction, the controller 180 can control a part of a previous page of a currently outputted page to be displayed on the currently outputted page in a manner of being overlaid with the currently outputted page. In this case, the second direction may correspond to a direction opposite to the first direction. Yet, it is not mandatory.

FIGS. 21A to 21C show an example that a next page or a previous page of a search result is outputted by a drag input inputted on the display unit 151. It is apparent that a touch input different from the example shown in the drawing can also be used for outputting a next page or a previous page.

In this case, as shown in the example of FIGS. 21A to 21C, in case of outputting the next page or the previous page of the currently outputted page by the drag input inputted on the display unit 151, it is necessary to determine whether the drag input corresponds to a drag input for scrolling the currently outputted page in up/down direction (or left/right direction) or a drag input for outputting the next page or the previous page. Hence, if moving speed of the pointer dragging the display unit 151 is less than predetermined speed, the controller 180 can control the currently outputted page to be scrolled by the drag input. If the moving speed of the pointer is equal to or greater than the predetermined speed, the controller 180 can control the next page or the previous page of the currently outputted page to be outputted in response to the drag input.

The step S405 of FIG. 4 shows an example of automatically activating the microphone 122 when a pointer enters the second region. The step S1508 of FIG. 15 shows an example of outputting a menu for inputting a keyword when a pointer enters the second region. In an embodiment mentioned earlier with reference to FIG. 4, if the pointer enters the second region, the menu for inputting a keyword can also be outputted. In this case, as mentioned earlier in FIGS. 17A to 17G, the controller 180 can output a keypad or activate the microphone 122 according to an item (icon) selected by a user.

Similarly, in embodiments mentioned earlier with reference to FIG. 15, if a pointer enters the second region, the microphone 122 can be automatically activated. In this case, as mentioned earlier in FIGS. 7A and 7B, the controller 180 can consider a text converted from voice, which is inputted via the microphone 122, as a keyword.

Since a search engine performs search for huge amount of web pages, the number of retrieved items (e.g., web page, image and the like) may vary according to a search word used for performing the web search. It is difficult for a user to find out an item preferred by the user at once among the huge amount of retrieved items. Hence, as mentioned earlier with reference to FIGS. 17A to 17G and FIGS. 18A and 18B, the controller 180 can perform re-search in a manner of adding a keyword or an image.

As an example different from what is mentioned earlier in FIGS. 17A to 17G and FIGS. 18A and 18B, the controller 180 can control means for adding a keyword or an image to be sequentially displayed according to a distance of which a pointer touching a predetermined second position is dragged.

Figure 22A:
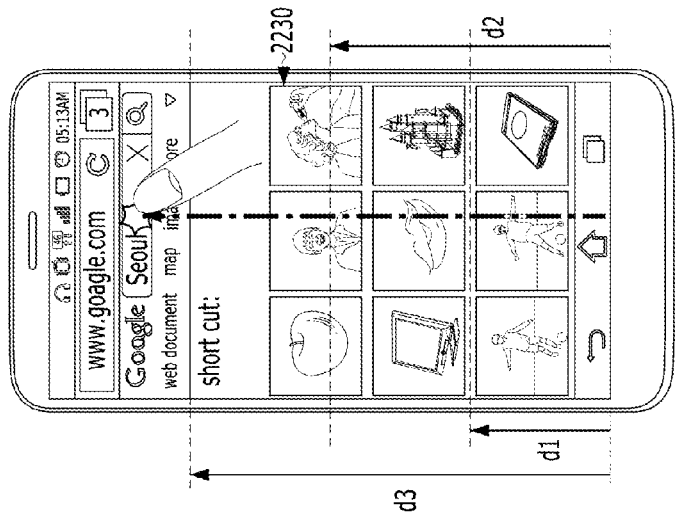
FIGS. 22A, 22B and 22C are diagrams for an example of changing an input means according to a drag moving distance of a pointer.
Figure 22B:
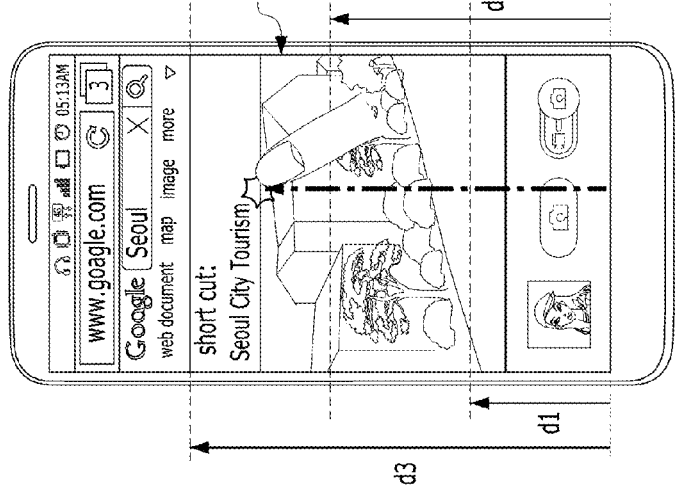
Figure 22C:
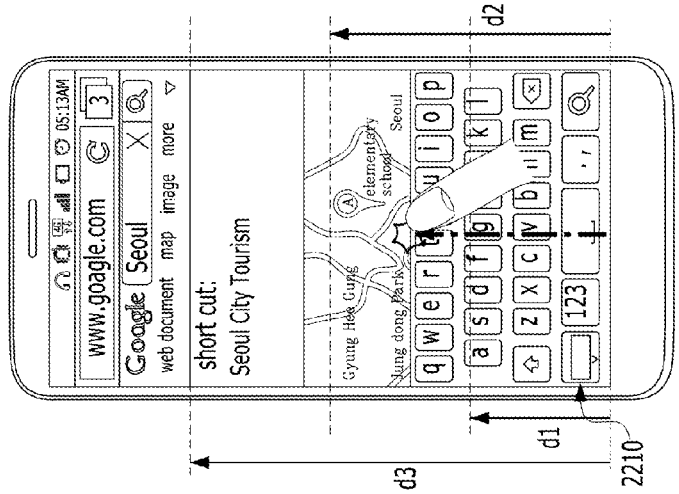

As an example, FIGS. 22A to 22C are diagrams for an example of changing an input means according to a drag moving distance of a pointer. If a pointer touching a second position is dragged as much as a distance equal to or more than a first distance (d1) and less than a second distance (d2) while a web search result is outputted, as shown in an example of FIG. 22A, the controller 180 can control a keypad 2210 to be outputted. Subsequently, if a keyword is inputted via the keypad 2210, the controller 180 can perform web search in a manner of combining a keyword (or image) used in previous web search and a newly inputted keyword with each other with "AND condition".

If a pointer is dragged as much as a distance equal to or greater than the second distance (d2) and less than a third distance (d3), the controller 180 stops outputting the keypad 2210. As shown in an example of FIG. 22B, the controller 180 can control a preview image 2220 for picture taking to be outputted. If a picture is taken, the controller 180 can perform web search in a manner of combining a keyword (or image) used in previous web search and a newly inputted keyword with each other with "AND condition".

If a pointer is dragged as much as a distance equal to or greater than the third distance (d3), the controller 180 stops outputting the preview image. As shown in an example of FIG. 22C, the controller 180 can control a list 2230 of images stored in the memory 170 to be outputted. If an image is selected from the list 2230 of images, the controller 180 can perform web search in a manner of combining a keyword (or image) used in previous web search and a newly inputted keyword with each other with "AND condition".

The embodiments mentioned earlier with reference to FIG. 17A to 17G and FIGS. 22A to 22C can be applied at the same time. As an example, the controller 180 can determine an embodiment to be executed among the two embodiments according to a touch point of a pointer (e.g., an embodiment of FIG. 17A to 17G is triggered when a left part of a bottom edge of the display unit 151 is touched and an embodiment of FIG. 22A to 22C is triggered when a left part of a bottom edge of the display unit 151 is touched) or time of touching a second position touched by the pointer (e.g., the embodiment of FIG. 17A to 17G is triggered when the pointer touches the second position less than prescribed time and dragged and the embodiment of FIG. 22A to 22C is triggered when the pointer touches the second position equal to or more than the prescribed time and dragged).

The embodiment mentioned earlier with reference to FIG. 22A to 22C can also be applied while a list of images is outputted.

Figure 23A:
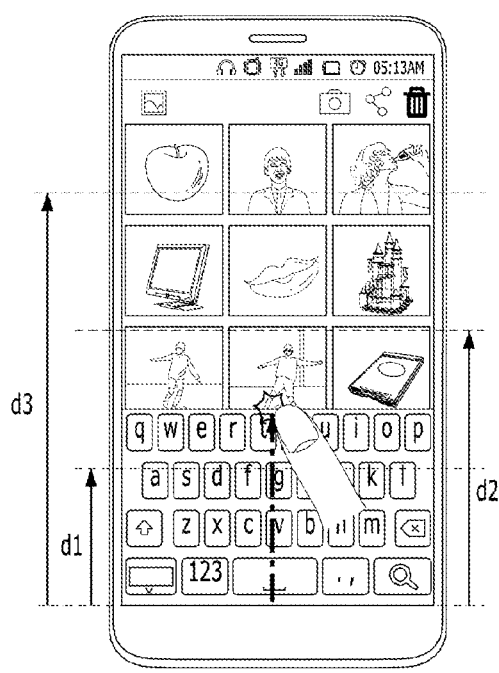
FIGS. 23A, 23B, 23C, 23D and 23E are diagrams for explaining an example of an operation of a mobile terminal 100 in case that a drag input is inputted while a list of images is outputted.

For example, FIGS. 23A to 23E are diagrams for explaining an example of an operation of a mobile terminal 100 in case that a drag input is inputted while a list of images is outputted If a pointer touching a predetermined position (e.g., in FIG. 23A, a bottom edge of the display unit 151) is dragged as much as a distance equal to or greater than a first distance (d1) and less than a second distance (d2) while a list of images is outputted, as shown in an example of FIG. 23A, the controller 180 can control a keypad to be outputted. If a text is inputted via the keypad, the controller 180 can perform image search based on the inputted text as a search word. Specifically, the controller 180 can control a search result including an image of a file name in which the search word is included, a captured image of an object (e.g., person or object) indicated by the search word and the like to be outputted.

Figure 23B:
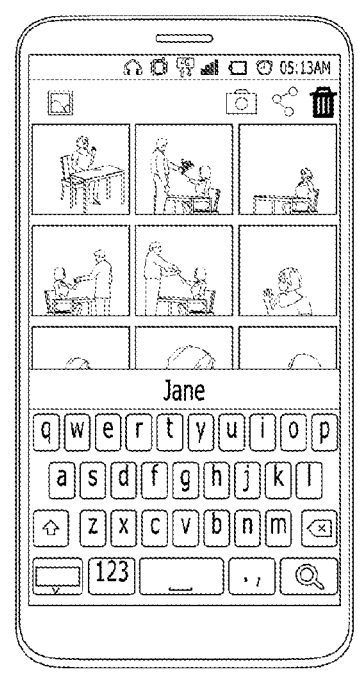
Figure 23C:
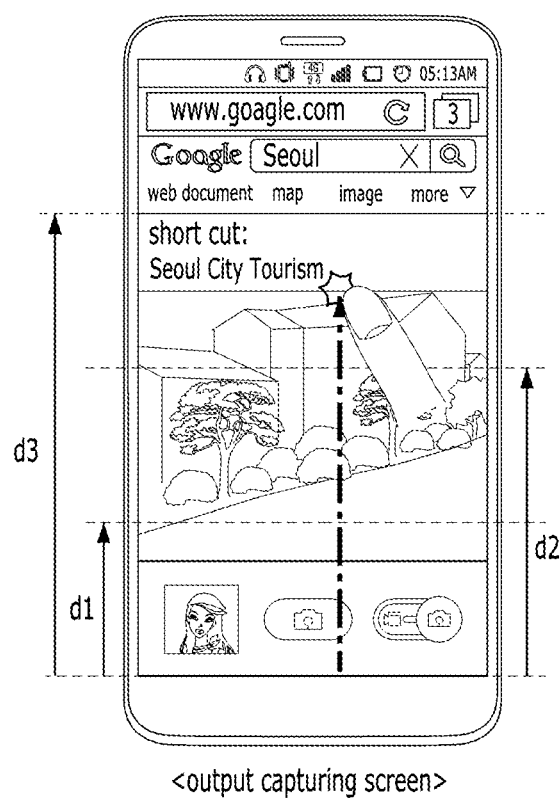
Figure 23D:
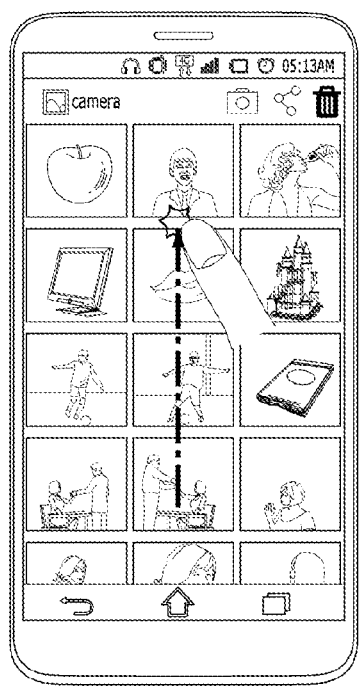

As an example, if 'Jane' is inputted, as shown in an example of FIG. 23B, the controller 180 can output a search result including an image of a file name in which such a text as 'Jane' is included, a picture of which such a person as Jane is captured and the like.

If the pointer is dragged as much as a distance equal to or greater than the second distance (d2), which is longer than the first distance (d1), the controller 180 stops outputting the keypad. As shown in an example of FIG. 23C, the controller 180 can control a preview image for capturing a picture to be outputted. If a picture is captured, the controller 180 can add the newly captured picture to the list of images.

Figure 23E:
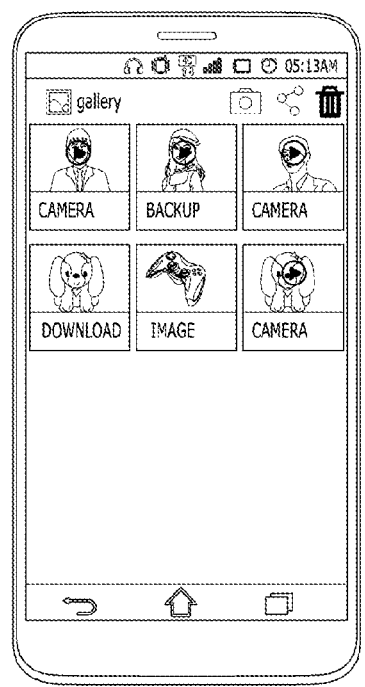

If a touch input flicking the touch input in prescribed direction is received while the list of images is outputted (e.g., in FIG. 23D, the pointer is flicking in up direction), the controller 180 can control a top-level folder of the currently outputted list of images or uppermost of the currently outputted list of images to be outputted. FIG. 23E shows an example that the top-level folder of the currently outputted list of images is outputted in response to the flicking input.

The embodiments mentioned earlier with reference to FIG. 4 and FIG. 17A to 17G can be implemented while a message is outputted. In this case, the message can include e-mail, a text message, an instant message and the like. Specifically, a user can select a transmission medium or a contact group via a first region and may be able to select a search word via a second region. If a search word is configured via the second region, the controller can display a search result of a message including the configured search word.

FIGS. 24A to 24F are diagrams for an example of outputting a search result of a message including a search word, which is configured while a pointer touches the display unit 151.

If a first position of the display unit 151 is touched while a message is outputted, the controller 180 can control the display unit 151 to be divided into a first region to a third region. Subsequently, if a pointer is dragged into the first region, as shown in an example of FIG. 24A, the controller 180 can control a list of message transmission media to be outputted. A message transmission medium may correspond to a medium capable of communicating with a prescribed counterpart such as e-mail, a text message, an instant message, SNS and the like. FIG. 24A shows an example that e-mail. A text message and SNS are included in the list of transmission media.

Subsequently, if the pointer is dragged to the second region, the controller can activate a microphone. If voice is inputted via the microphone, the controller can control a result of which the inputted voice is converted into a text to be outputted. As an example, FIG. 24B shows an example that 'Seoul' is inputted by voice of a user. Subsequently, if the user releases the pointer from the second region, as shown in an example of FIG. 24C, the controller can control a search result of messages including a search word, which is configured while the second region is touched, to be outputted among messages transceived via a transmission medium selected via the first region.

FIGS. 24A to 24C show an example that a list of transmission media is outputted via the first region. Unlike the example shown in FIG. 24A to 24C, the controller can control a list of contact groups to be outputted via the first region.

As an example, if a pointer touching a first position of the display unit 151 is dragged into the first region, the controller can control a list of contact groups to be outputted via the first region. FIG. 24D shows an example that 'family', 'company' and 'friend' contact groups are included in the list of contact groups.

Subsequently, if the pointer is dragged into the second region, the controller can activate a microphone. If voice is inputted via the microphone, the controller can control a result of which the inputted voice is converted into a text to be outputted. As an example, FIG. 24E shows an example that 'Seoul' is inputted by voice of a user. Subsequently, if the user releases the pointer from the second region, as shown in an example of FIG. 24F, the controller can control a search result of messages including a search word, which is configured while the second region is touched, to be outputted among messages transceived with members of a contact group selected via the first region.

Although it is not depicted, as mentioned earlier with reference to FIGS. 9A to 9F, if the pointer moves to the third region, the controller can output a keypad.

Moreover, if the pointer touches a second position, as mentioned earlier in the embodiment of FIG. 15, re-search can be performed using a keyword used in previous web search and a newly inputted keyword. If the pointer touches the second position, as mentioned earlier with reference to FIG. 24A to 24F, a list of transmission media or a list of contact groups can be outputted via the first region.

Accordingly, embodiments of the present invention provide various effects and/or features.

According to the present invention, it is able to provide a user with a mobile terminal enhancing user convenience.

Specifically, according to the present invention, it is able to provide a user with a mobile terminal capable of easily selecting a search engine to be used for web search.

Moreover, according to the present invention, it is able to provide a user with a mobile terminal capable of easily selecting a keyword to be used for web search.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a microphone;
   a wireless communication unit;
   a display comprising a first region, a second region, and a third region; and
   a controller configured to:
   cause the display to display a list of search engines for web search in the first region in response to a first input, wherein the first input is touching, by a pointer, a first position on the display and dragging the pointer from the touched first position to the first region;
   activate the microphone in response to a second input received after a first search engine is selected from the list of search engines, wherein the second input is dragging the pointer that is in contact with the first region without being released from the first region after the first input is received from the first region to the second region;
   cause the display to display a first text in the second region, the first text generated by converting voice input received via the activated microphone; and
   cause the wireless communication unit to communicate with the selected first search engine to perform web search using the displayed first text in response to a third input, wherein the third input is releasing the pointer that is in contact with the second region from the second region to which the pointer was dragged to activate the microphone.

2. The mobile terminal of claim 1, wherein the controller is further configured to cause the display to display a keypad in the third region in response to a fourth input, the fourth input comprising dragging the pointer from the first region to the third region.

3. The mobile terminal of claim 1, wherein the controller is further configured to select the first search engine from the list of search engines in response to dragging of the pointer to the first search engine in the first region.

4. The mobile terminal of claim 1, wherein if the second input is received without selection of the first search engine by a user, the controller is further configured to perform the web search by communicating with the first search engine that is set as a default search engine.

5. The mobile terminal of claim 1, wherein the controller is further configured to cause the display to display a keypad in the third region or in a region including the third region in response to a fourth input, the fourth input comprising dragging the pointer from the second region to the third region while the first text is displayed in the second region, wherein the keypad is used to modify or edit the first text displayed in the second region.

6. The mobile terminal of claim 1, wherein the controller is further configured to delete the first text displayed in the second region in response to a fourth input, the fourth input comprising dragging the pointer in a prescribed direction in the second region while the first text is displayed in the second region.

7. The mobile terminal of claim 1, further comprising a camera configured to capture an image,
   wherein the controller is further configured to:
   activate the camera in response to a fourth input received after the first search engine is selected, the fourth input comprising dragging the pointer from the first region to the third region; and
   cause the activated camera to capture an image and perform web search using the captured image by communicating with the first search engine in response to a fifth input, the fifth input comprising releasing the pointer that is in contact with the third region from the third region.

8. The mobile terminal of claim 1, wherein the controller is further configured to:
   cause the display to display a list of images stored in the mobile terminal in response to a fourth input received after the first search engine is selected, the fourth input comprising dragging the pointer from the first region to the third region; and
   cause the wireless communication unit to communicate with the first search engine to perform web search using an image selected from the list of images in response to a fifth input, the fifth input comprising touching, by the pointer, the selected image.

9. The mobile terminal of claim 1, wherein the controller is further configured to:
   cause the display to display the list of search engines in the first region in response to a fourth input received while a result of the web search is displayed, the fourth input comprising dragging the pointer from a second position on the display to the first region; and
   cause the wireless communication unit to communicate with a second search engine selected from the list of search engines to perform web search in response to a fifth input, the fifth input comprising touching, by the pointer, the second search engine and releasing the pointer that is in contact with the second search engine from the first region.

10. The mobile terminal of claim 1, wherein the controller is further configured to:
    cause the display to display a keypad in the first region or in a region including the first region in response to a fourth input received while a result of the web search is displayed, the fourth input comprising dragging the pointer from a second position on the display to the second region;
    cause the display to display a second text in the second region in response to user input received via the keypad; and
    perform web search using both the first text and the second text that are bound by an 'AND' operator.

11. The mobile terminal of claim 10, wherein the controller is further configured to cause the display to display both the first text and the second text together in the second region.

12. The mobile terminal of claim 1, wherein the controller is further configured to:
    cause the display to display a keypad in the first region or in a region including the first region in response to a fourth input received while a result of the web search is displayed, the fourth input comprising dragging the pointer from a second position on the display to the third region;
    cause the display to display a second text in the second region in response to user input received via the keypad; and
    perform web search using the first text, but excluding the second text by applying a 'NOT' operator to the second text.

13. The mobile terminal of claim 1, wherein the controller is further configured to cause the display to display a keypad in response to a fourth input received while a result of the web search is displayed, the fourth input comprising touching, by the pointer, a second position on the display and dragging from the touched second position in a prescribed direction for a distance that is equal to or greater than a first distance, but that is less than a second distance.

14. The mobile terminal of claim 13, wherein the controller is further configured to:
    cause the display to display a second text in response to user input received via the keypad; and
    perform web search using both the first text and the second text that are bound by an 'AND' operator.

15. The mobile terminal of claim 13, further comprising a camera,
    wherein the controller is further configured to activate the camera and cause the display to display a preview image obtained from the activated camera in response to a fifth input received while the result of the web search is displayed, the fifth input comprising dragging the pointer from the touched second position in the prescribed direction for a distance that is equal to or greater than the second distance, but that is less than a third distance.

16. The mobile terminal of claim 15, wherein the controller is further configured to perform web search using the first text and an image captured by the camera that are bound by an 'AND' operator in response to a sixth input for capturing the image that is received while the preview image is displayed.

17. The mobile terminal of claim 15, wherein the controller is further configured to cause the display to display a list of images stored in the mobile terminal in response to a sixth input received while the result of the web search is displayed, the sixth input comprising dragging the pointer from the touched second position in the prescribed direction for a distance that is equal to or greater than the third distance.

18. The mobile terminal of claim 17, wherein the controller is further configured to perform web search using the first text and an image selected from the list of images that are bound by an 'AND' operator in response to a seventh input for selecting the image from the list of images.

19. The mobile terminal of claim 1, wherein the controller is further configured to cause the display to display the first region, the second region, and the third region identifiably when the first position is touched by the pointer and prior to the dragging of the pointer from the first position.

20. A method for controlling a mobile terminal comprising a microphone, a wireless communication unit, and a display, the display comprising a first region and a second region, wherein the method comprises:
    displaying, in the first region of the display, a list of search engines for web search in response to a first input, wherein the first input is touching, by a pointer, a first position on the display and dragging the pointer from the touched first position to the first region;
    activating the microphone in response to a second input received after a search engine is selected from the list of search engines, wherein the second input is dragging the pointer that is in contact with the first region without being released from the first region after the first input is received from the first region to the second region;

displaying, in the second region of the display, a text generated by converting voice input received via the activated microphone; and communicating with the selected search engine via the wireless communication unit to perform web search using the displayed text in response to a third input, wherein the third input is releasing the pointer that is in contact with the second region from the second region to which the pointer was dragged to activate the microphone.

* * * * *